US012452898B2

(12) United States Patent
Bai et al.

(10) Patent No.: US 12,452,898 B2
(45) Date of Patent: Oct. 21, 2025

(54) TECHNIQUES FOR INDICATING PANEL INFORMATION REPORTS VIA BEAM REPORTING OCCASIONS

(71) Applicant: QUALCOMM Incorporated, San Diego, CA (US)

(72) Inventors: Tianyang Bai, Somerville, NJ (US); Yan Zhou, San Diego, CA (US); Jelena Damnjanovic, Del Mar, CA (US); Tao Luo, San Diego, CA (US); Junyi Li, Fairless Hills, PA (US); Konstantinos Dimou, New York City, NY (US); Peter Gaal, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 18/059,896

(22) Filed: Nov. 29, 2022

(65) Prior Publication Data
US 2023/0247664 A1 Aug. 3, 2023

Related U.S. Application Data

(60) Provisional application No. 63/305,484, filed on Feb. 1, 2022.

(51) Int. Cl.
*H04W 72/542* (2023.01)
*H04W 72/23* (2023.01)

(52) U.S. Cl.
CPC ......... *H04W 72/542* (2023.01); *H04W 72/23* (2023.01)

(58) Field of Classification Search
CPC ..................... H04W 72/542; H04W 72/23
See application file for complete search history.

(56) References Cited

U.S. PATENT DOCUMENTS

| | | | |
|---|---|---|---|
| 2018/0092129 A1* | 3/2018 | Guo | H04W 72/046 |
| 2021/0068015 A1* | 3/2021 | Yang | H04W 36/38 |
| 2021/0336670 A1* | 10/2021 | Taherzadeh Boroujeni | H04W 24/10 |
| 2022/0124739 A1* | 4/2022 | Bai | H04W 72/542 |
| 2022/0311478 A1* | 9/2022 | Sun | H04B 7/0469 |
| 2023/0135507 A1* | 5/2023 | Taherzadeh Boroujeni | H04L 1/0026 370/329 |
| 2024/0171356 A1* | 5/2024 | Zhang | H04W 72/231 |

\* cited by examiner

*Primary Examiner* — Won Tae C Kim
(74) *Attorney, Agent, or Firm* — QUALCOMM IP DEPT.; James Hunt Yancey, Jr.

(57) ABSTRACT

Methods, systems, and devices for wireless communications are described. A user equipment (UE) may receive control signaling indicating a set of transmission occasions usable by the UE for transmitting layer one (L1) reports. The set of transmission occasions may include a first subset of transmission occasions for transmitting beam information reports and a second subset of transmission occasions for transmitting beam information reports and corresponding antenna port information. The UE may then transmit, within a first transmission occasion of the first subset of transmission occasions, a first L1 report including a first beam information report, and may transmit, within a second transmission occasion of the second subset of transmission occasions, a second L1 report including a second beam information report and an indication of a quantity of antenna ports supported by the UE.

30 Claims, 16 Drawing Sheets

TECHNIQUES FOR INDICATING PANEL INFORMATION REPORTS VIA BEAM REPORTING OCCASIONS

CROSS REFERENCE

The present application for patent claims the benefit of U.S. Provisional Patent Application No. 63/305,484 by BAI et al., entitled "TECHNIQUES FOR INDICATING PANEL INFORMATION REPORTS VIA BEAM REPORTING OCCASIONS," filed Feb. 1, 2022, assigned to the assignee hereof, and expressly incorporated by reference herein.

FIELD OF TECHNOLOGY

The following relates to wireless communications, including techniques for indicating panel information reports via beam reporting occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

SUMMARY

The described techniques relate to improved methods, systems, devices, and apparatuses that support techniques for indicating panel information reports via beam reporting occasions. Generally, aspects of the present disclosure support signaling, rules, and configurations which enable traditional Layer 1 (L1) reports (e.g., L1 reports including beam information) and new L1 reports including antenna panel information (e.g., L1 reports including beam information and antenna panel information) to be transmitted with varying periodicities or regularities. For example, in some cases, a user equipment (UE) is configured with separate sets of transmission occasions for (1) traditional L1 reports, and (2) new L1 reports with antenna panel information, where the separate sets of transmission occasions have different periodicities. In this example, the UE is configured to transmit traditional L1 reports (e.g., L1 reports including only beam information) via the first set of transmission occasions, and is configured to transmit new L1 reports including antenna panel information via the second set of transmission occasions. In some aspects, the network entity transmits hybrid automatic repeat request (HARQ) feedback (e.g., acknowledgment (ACK)/negative acknowledgment (NACK)) in response to L1 reports received on the second set of transmission occasions dedicated for L1 reports with antenna panel information.

A method for wireless communication at a UE is described. The method may include receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information, transmitting, within a first transmission occasion of the first subset of transmission occasions, a first L1 report including a first beam information report, and transmitting, within a second transmission occasion of the second subset of transmission occasions, a second L1 report including a second beam information report and an indication of a quantity of antenna ports supported by the UE.

An apparatus for wireless communication at a UE is described. The apparatus may include a processor, memory coupled with the processor, and instructions stored in the memory. The instructions may be executable by the processor to cause the apparatus to receive control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information, transmit, within a first transmission occasion of the first subset of transmission occasions, a first L1 report including a first beam information report, and transmit, within a second transmission occasion of the second subset of transmission occasions, a second L1 report including a second beam information report and an indication of a quantity of antenna ports supported by the UE.

Another apparatus for wireless communication at a UE is described. The apparatus may include means for receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information, means for transmitting, within a first transmission occasion of the first subset of transmission occasions, a first L1 report including a first beam information report, and means for transmitting, within a second transmission occasion of the second subset of transmission occasions, a second L1 report including a second beam information report and an indication of a quantity of antenna ports supported by the UE.

A non-transitory computer-readable medium storing code for wireless communication at a UE is described. The code may include instructions executable by a processor to receive control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information, transmit, within a first transmission occasion of the first subset of transmission occasions, a first L1 report including a first beam information report, and transmit, within a second transmission occasion of the second subset of transmission occasions, a second L1 report including a second beam information report and an indication of a quantity of antenna ports supported by the UE.

Some examples of the method, apparatuses, and non-transitory computer-readable medium described herein may further include operations, features, means, or instructions for receiving, via the control signaling, an indication of a first periodicity associated with the first subset of transmission occasions and a second periodicity associated with the second subset of transmission occasions, where the first L1 report may be transmitted in accordance with the first periodicity, and where the second L1 report may be transmitted in accordance with the second periodicity.

In some examples of the method, apparatuses, and non-transitory computer-readable medium described herein, receiving the control signaling indicating the first and second periodicities may include operations, features, means, or instructions for receiving a radio resource control (RRC) message associated with a reporting configuration, the RRC message indicating a set of multiple periodicities associated with the reporting configuration, where the set of multiple periodicities include at least the first periodicity and the second periodicity.

In some examples of the method, apparatuses, and non-transitory computer-readable medium described herein, receiving the control signaling indicating the first and second periodicities may include operations, features, means, or instructions for receiving a first RRC message associated with a first reporting configuration, the first RRC message indicating the first periodicity associated with the first reporting configuration and receiving a second RRC message associated with a second reporting configuration, the second RRC message indicating the second periodicity associated with the second reporting configuration.

In some examples of the method, apparatuses, and non-transitory computer-readable medium described herein, the first periodicity may be associated with a greater frequency as compared to the second periodicity.

Some examples of the method, apparatuses, and non-transitory computer-readable medium described herein may further include operations, features, means, or instructions for transmitting, within a third transmission occasion of the second subset of transmission occasions, a third L1 report including a third beam information report and transmitting, via the third L1 report, an indication that the third L1 report does not include antenna port information.

Some examples of the method, apparatuses, and non-transitory computer-readable medium described herein may further include operations, features, means, or instructions for initiating a reporting prohibit timer based on transmitting the second L1 report and transmitting the third L1 report without antenna port information based on the third transmission occasion being positioned prior to an expiration of the reporting prohibit timer in a time domain.

Some examples of the method, apparatuses, and non-transitory computer-readable medium described herein may further include operations, features, means, or instructions for receiving, via the control signaling, an indication of the reporting prohibit timer, where initiating the reporting prohibit timer may be based on receiving the control signaling.

Some examples of the method, apparatuses, and non-transitory computer-readable medium described herein may further include operations, features, means, or instructions for transmitting, within a fourth transmission occasion of the second subset of transmission occasions, a fourth L1 report including a fourth beam information report and an indication of the quantity of antenna ports supported by the UE, a second quantity of antenna ports supported by the UE, or both and transmitting, via the fourth L1 report, an indication that the fourth L1 report includes antenna port information based on the fourth transmission occasion being positioned subsequent to the expiration of the reporting prohibit timer in the time domain.

Some examples of the method, apparatuses, and non-transitory computer-readable medium described herein may further include operations, features, means, or instructions for refraining from transmitting a third L1 report within a third transmission occasion of the second subset of transmission occasions.

Some examples of the method, apparatuses, and non-transitory computer-readable medium described herein may further include operations, features, means, or instructions for monitoring for feedback messages based on transmitting the second L1 report and receiving a feedback message responsive to the second L1 report based on the monitoring.

Some examples of the method, apparatuses, and non-transitory computer-readable medium described herein may further include operations, features, means, or instructions for receiving a control message indicating an activation of the second subset of transmission occasions, where transmitting the second L1 report may be based on the activation.

Some examples of the method, apparatuses, and non-transitory computer-readable medium described herein may further include operations, features, means, or instructions for receiving a second control message indicating a deactivation of the second subset of transmission occasions and refraining from transmitting a third L1 report via the second subset of transmission occasions based on the deactivation.

In some examples of the method, apparatuses, and non-transitory computer-readable medium described herein, the control signaling includes an RRC message and the control message includes a downlink control information (DCI) message, a medium access control-control element (MAC-CE) message, or both.

In some examples of the method, apparatuses, and non-transitory computer-readable medium described herein, receiving the control signaling may include operations, features, means, or instructions for receiving an RRC message indicating the first subset of transmission occasions and receiving a DCI message scheduling the second L1 report within the first subset of transmission occasions.

Some examples of the method, apparatuses, and non-transitory computer-readable medium described herein may further include operations, features, means, or instructions for receiving a control message in response to the second L1 report, the control message including an acknowledgment of the second L1 report and indicating one or more updated transmission configuration indicator (TCI) states associated with the second beam information report, the quantity of antenna ports, or both.

Some examples of the method, apparatuses, and non-transitory computer-readable medium described herein may further include operations, features, means, or instructions for receiving a control message in response to the second L1 report, the control message indicating a TCI codepoint associated with an acknowledgment of the second L1 report.

Some examples of the method, apparatuses, and non-transitory computer-readable medium described herein may further include operations, features, means, or instructions for receiving a feedback message in response to the second L1 report.

In some examples of the method, apparatuses, and non-transitory computer-readable medium described herein, the feedback message includes a NACK message and the method, apparatuses, and non-transitory computer-readable medium may include further operations, features, means, or instructions for transmitting, in response to the NACK message and within a third transmission occasion of the second subset of transmission occasions, a third L1 report including the second beam information report and an indication of the quantity of antenna ports supported by the UE.

Some examples of the method, apparatuses, and non-transitory computer-readable medium described herein may further include operations, features, means, or instructions for receiving, via the control signaling, additional control signaling, or both, an indication of a set of resources associated with a set of multiple reference signals, receiving the set of multiple reference signals within the set of resources, and performing measurements on the set of multiple reference signals, where the first beam information report, the second beam information report, or both, may be based on the measurements.

Some examples of the method, apparatuses, and non-transitory computer-readable medium described herein may further include operations, features, means, or instructions for receiving, from a network entity and based on the second L1 report, a control message scheduling a communication between the UE and the network entity and performing the communication with the network entity in accordance with the quantity of antenna ports supported by the UE.

In some examples of the method, apparatuses, and non-transitory computer-readable medium described herein, the second subset of transmission occasions may be included within the first subset of transmission occasions.

A method for wireless communication at a network entity is described. The method may include transmitting control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information, receiving, within a first transmission occasion of the first subset of transmission occasions, a first L1 report including a first beam information report, and receiving, within a second transmission occasion of the second subset of transmission occasions, a second L1 report including a second beam information report and an indication of a quantity of antenna ports supported by the UE.

An apparatus for wireless communication at a network entity is described. The apparatus may include a processor, memory coupled with the processor, and instructions stored in the memory. The instructions may be executable by the processor to cause the apparatus to transmit control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information, receive, within a first transmission occasion of the first subset of transmission occasions, a first L1 report including a first beam information report, and receive, within a second transmission occasion of the second subset of transmission occasions, a second L1 report including a second beam information report and an indication of a quantity of antenna ports supported by the UE.

Another apparatus for wireless communication at a network entity is described. The apparatus may include means for transmitting control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information, means for receiving, within a first transmission occasion of the first subset of transmission occasions, a first L1 report including a first beam information report, and means for receiving, within a second transmission occasion of the second subset of transmission occasions, a second L1 report including a second beam information report and an indication of a quantity of antenna ports supported by the UE.

A non-transitory computer-readable medium storing code for wireless communication at a network entity is described. The code may include instructions executable by a processor to transmit control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information, receive, within a first transmission occasion of the first subset of transmission occasions, a first L1 report including a first beam information report, and receive, within a second transmission occasion of the second subset of transmission occasions, a second L1 report including a second beam information report and an indication of a quantity of antenna ports supported by the UE.

Some examples of the method, apparatuses, and non-transitory computer-readable medium described herein may further include operations, features, means, or instructions for transmitting, via the control signaling, an indication of a first periodicity associated with the first subset of transmission occasions and a second periodicity associated with the second subset of transmission occasions, where the first L1 report may be received in accordance with the first periodicity, and where the second L1 report may be received in accordance with the second periodicity.

In some examples of the method, apparatuses, and non-transitory computer-readable medium described herein, receiving the control signaling indicating the first and second periodicities may include operations, features, means, or instructions for transmitting an RRC message associated with a reporting configuration, the RRC message indicating a set of multiple periodicities associated with the reporting configuration, where the set of multiple periodicities include at least the first periodicity and the second periodicity.

In some examples of the method, apparatuses, and non-transitory computer-readable medium described herein, transmitting the control signaling indicating the first and second periodicities may include operations, features, means, or instructions for transmitting a first RRC message associated with a first reporting configuration, the first RRC message indicating the first periodicity associated with the first reporting configuration and transmitting a second RRC message associated with a second reporting configuration, the second RRC message indicating the second periodicity associated with the second reporting configuration.

In some examples of the method, apparatuses, and non-transitory computer-readable medium described herein, the first periodicity may be associated with a greater frequency as compared to the second periodicity.

Some examples of the method, apparatuses, and non-transitory computer-readable medium described herein may further include operations, features, means, or instructions for receiving, within a third transmission occasion of the second subset of transmission occasions, a third L1 report including a third beam information report and receiving, via the third L1 report, an indication that the third L1 report does not include antenna port information.

Some examples of the method, apparatuses, and non-transitory computer-readable medium described herein may further include operations, features, means, or instructions for initiating a reporting prohibit timer based on receiving the second L1 report and receiving the third L1 report without antenna port information based on the third transmission occasion being positioned prior to an expiration of the reporting prohibit timer in a time domain.

Some examples of the method, apparatuses, and non-transitory computer-readable medium described herein may further include operations, features, means, or instructions for transmitting, via the control signaling, an indication of the reporting prohibit timer, where initiating the reporting prohibit timer may be based on transmitting the control signaling.

Some examples of the method, apparatuses, and non-transitory computer-readable medium described herein may further include operations, features, means, or instructions for receiving, within a fourth transmission occasion of the second subset of transmission occasions, a fourth L1 report including a fourth beam information report and an indication of the quantity of antenna ports supported by the UE, a second quantity of antenna ports supported by the UE, or both and receiving, via the fourth L1 report, an indication that the fourth L1 report includes antenna port information based on the fourth transmission occasion being positioned subsequent to the expiration of the reporting prohibit timer in the time domain.

Some examples of the method, apparatuses, and non-transitory computer-readable medium described herein may further include operations, features, means, or instructions for transmitting a control message indicating an activation of the second subset of transmission occasions, where receiving the second L1 report may be based on the activation.

In some examples of the method, apparatuses, and non-transitory computer-readable medium described herein, the control signaling includes an RRC message and the control message includes a DCI message, a MAC-CE message, or both.

In some examples of the method, apparatuses, and non-transitory computer-readable medium described herein, receiving the control signaling may include operations, features, means, or instructions for transmitting an RRC message indicating the first subset of transmission occasions and transmitting a DCI message scheduling the second L1 report within the first subset of transmission occasions.

Some examples of the method, apparatuses, and non-transitory computer-readable medium described herein may further include operations, features, means, or instructions for transmitting a control message in response to the second L1 report, the control message including an acknowledgment of the second L1 report and indicating one or more updated TCI states associated with the second beam information report, the quantity of antenna ports, or both.

Some examples of the method, apparatuses, and non-transitory computer-readable medium described herein may further include operations, features, means, or instructions for transmitting a control message in response to the second L1 report, the control message indicating a TCI codepoint associated with an acknowledgment of the second L1 report.

Some examples of the method, apparatuses, and non-transitory computer-readable medium described herein may further include operations, features, means, or instructions for transmitting a feedback message in response to the second L1 report.

In some examples of the method, apparatuses, and non-transitory computer-readable medium described herein, the feedback message includes a NACK message and the method, apparatuses, and non-transitory computer-readable medium may include further operations, features, means, or instructions for receiving, in response to the NACK message and within a third transmission occasion of the second subset of transmission occasions, a third L1 report including the second beam information report and an indication of the quantity of antenna ports supported by the UE.

Some examples of the method, apparatuses, and non-transitory computer-readable medium described herein may further include operations, features, means, or instructions for transmitting, to the UE and based on the second L1 report, a control message scheduling a communication between the UE and the network entity and performing the communication with the UE in accordance with the quantity of antenna ports supported by the UE.

In some examples of the method, apparatuses, and non-transitory computer-readable medium described herein, the second subset of transmission occasions may be included within the first subset of transmission occasions.

DETAILED DESCRIPTION

Figure 1:
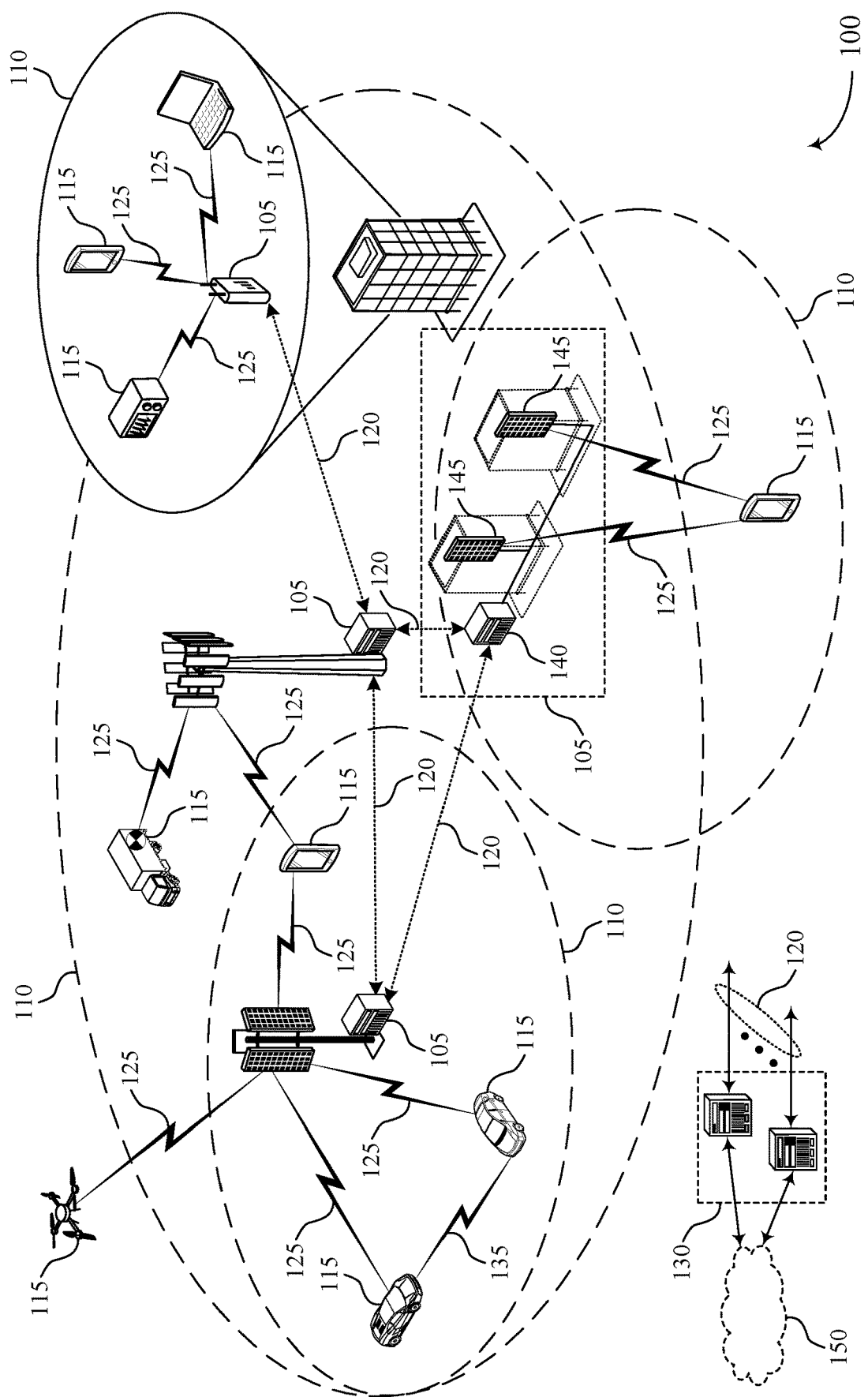
FIG. 1 illustrates an example of a wireless communications system that supports techniques for indicating panel information reports via beam reporting occasions in accordance with aspects of the present disclosure.

In some wireless communications systems, wireless devices (e.g., user equipments (UEs)) may periodically measure reference signals from the network, and may transmit Layer 1 (L1) reports including beam information. In particular, UEs may measure other beam pairs, and indicate to the network (via L1 reports) whether other beam pairs exhibit better performance as compared to a currently-active beam pair. In some wireless communications systems, L1 reports may also be used to indicate antenna panel information in addition to beam information. For example, some wireless communications systems enable UEs to utilize L1 reports to communicate beam information and indicate maximum quantities of antenna ports supported at the UEs. However, beam information is updated much more frequently than antenna panel information. As such, including antenna panel information within every L1 report may be unnecessary, and result in increased or unnecessary signaling by the UEs. Additionally, network entities are expected to transmit hybrid automatic repeat request (HARQ) feedback (e.g., acknowledgment (ACK)/negative acknowledgment (NACK)) for all messages including antenna panel information, but are not expected to transmit HARQ feedback in response to traditional L1 reports including only beam information. As such, including antenna panel information within every L1 report would also result in increased control signaling overhead (e.g., ACK/NACK) at the network entity.

Accordingly, aspects of the present disclosure are directed to signaling, rules, and configurations which enable traditional/legacy L1 reports (e.g., L1 reports including only beam information) and new L1 reports including antenna panel information (e.g., L1 reports including beam information and antenna panel information) to be transmitted with varying periodicities or regularities.

For example, in some cases, a UE is configured with separate sets of transmission occasions for (1) traditional L1 reports, and (2) L1 reports with antenna panel information, where the separate sets of transmission occasions have different periodicities. In this example, the UE is configured to transmit traditional L1 reports (e.g., L1 reports including only beam information) via the first set of transmission occasions, and is configured to transmit new L1 reports including antenna panel information via the second set of transmission occasions. As such, the separate sets of transmission occasions enable the UE to report beam information and antenna panel information at differing periodicities or regularities. Moreover, the network entity may only be expected to transmit ACK/NACK in response to L1 reports received on the second set of transmission occasions dedicated for L1 reports with antenna panel information, thereby reducing control signaling overhead.

In some cases, a UE may autonomously refrain from transmitting new L1 reports including antenna panel information within dedicated transmission occasions. For example, the UE may activate a prohibit timer upon transmitting an L1 report including antenna panel information, and may refrain from transmitting additional L1 reports including antenna panel information until after the prohibit timer expires. In other cases, the network may dynamically activate and deactivate sets of transmission occasions which are dedicated for L1 reports with antenna panel information. Such techniques may reduce a frequency at which UEs must report antenna panel information, and may reduce HARQ signaling at the network entity.

Aspects of the disclosure are initially described in the context of wireless communications systems. Additional aspects of the disclosure are described in the context of an example resource configuration and an example process flow. Aspects of the disclosure are further illustrated by and described with reference to apparatus diagrams, system diagrams, and flowcharts that relate to techniques for indicating panel information reports via beam reporting occasions.

FIG. 1 illustrates an example of a wireless communications system 100 that supports techniques for indicating panel information reports via beam reporting occasions in accordance with aspects of the present disclosure. The wireless communications system 100 may include one or more base stations or network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network entity 105, entity of a core network 130, apparatus, device, or computing system configured to perform any techniques described herein. For example, a network node may be a UE 115. As another example, a network node may be a network entity 105. As another example, a first network node may be configured to communicate with a second network node or a third network node. In one aspect of this example, the first network node may be a UE 115, the second network node may be a network entity 105, and the third network node may be a UE 115. In another aspect of this example, the first network node may be a UE 115, the second network node may be a network entity 105, and the third network node may be a network entity 105. In yet other aspects of this example, the first, second, and third network nodes may be different. Similarly, reference to a UE 115, a network entity 105, an apparatus, a device, or a computing system may include disclosure of the UE 115, network entity 105, apparatus, device, or computing system being a network node. For example, disclosure that a UE 115 is configured to receive information from a network entity 105 also discloses that a first network node is configured to receive information from a second network node. In this example, consistent with this disclosure, the first network node may refer to a first UE 115, a first network entity 105, a first apparatus, a first device, or a first computing system configured to receive the information; and the second network node may refer to a second UE 115, a second network entity 105, a second apparatus, a second device, or a second computing system.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

As described herein, a network entity 105 may include one or more components, such as network nodes or network entities, that are located at a single physical location or one or more components located at various physical locations. In examples in which the network entity 105 includes components that are located at various physical locations, the various components may each perform various functions such that, collectively, the various components achieve functionality that is similar to a network entity 105 that is located at a single physical location. As such, a network entity 105 described herein may equivalently refer to a standalone network entity 105 (also known as a monolithic network entity) or a network entity 105 including components that are located at various physical locations or virtualized locations (also known as a disaggregated network entity). In some implementations, such a network entity 105 including components that are located at various physical locations may be referred to as or may be associated with a disaggregated radio access network (RAN) architecture, such as an Open RAN (O-RAN) or Virtualized RAN (VRAN) architecture. In some implementations, such components of a network entity 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from one or more components of the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the network entities 105 of the wireless communications system 100 may support signaling, rules, and configurations which enable traditional/legacy L1 reports (e.g., L1 reports including only beam information) and new L1 reports including antenna panel information (e.g., L1 reports including beam information and antenna panel information) to be transmitted with varying periodicities or regularities.

For example, in some cases, a UE 115 of the wireless communications system 100 may be configured with separate sets of transmission occasions for (1) traditional L1 reports, and (2) L1 reports with antenna panel information, where the separate sets of transmission occasions have different periodicities. In this example, the UE 115 may be configured to transmit traditional L1 reports (e.g., L1 reports including only beam information) via the first set of transmission occasions, and may be configured to transmit new L1 reports including antenna panel information via the second set of transmission occasions. As such, the separate sets of transmission occasions may enable the UE 115 to report beam information and antenna panel information at differing periodicities or regularities. Moreover, the network entity 105 of the wireless communications system 100 may only be expected to transmit ACK/NACK in response to L1 reports received on the second set of transmission occasions dedicated for L1 reports with antenna panel information, thereby reducing control signaling overhead.

In some cases, the UE 115 of the wireless communications system 100 may autonomously refrain from transmitting new L1 reports including antenna panel information within dedicated transmission occasions. For example, the UE 115 may activate a prohibit timer upon transmitting an L1 report including antenna panel information, and may refrain from transmitting additional L1 reports including antenna panel information until after the prohibit timer expires. In other cases, the network may dynamically (e.g., via DCI/MAC-CE) activate and deactivate sets of transmission occasions which are dedicated for L1 reports with antenna panel information. The network may dynamically activate/deactivate transmission occasions dedicated for L1 reports including antenna panel information via downlink control information (DCI) messages, MAC-control element (MAC-CE) messages, and the like.

Techniques described herein may enable traditional/legacy L1 reports (e.g., L1 reports including beam information) to be communicated at a different periodicity or regularity as compared to new L1 reports including antenna panel information. In particular, techniques described herein may enable UEs 115 to communicate beam information via L1 reports more frequently than antenna panel information. In this regard, techniques described herein may reduce a frequency at which UEs 115 must report antenna panel information, thereby reducing signaling and power consumption at the UEs 115, and leading to a more efficient use of resources within the wireless communications system 100. Moreover, due to the fact that network entities 105 may be configured to transmit HARQ feedback in response to antenna panel information, by reducing a frequency with which antenna panel information is communicated via L1 reports, techniques described herein may reduce HARQ signaling at the network entity 105, further reducing control signaling overhead, improving resource utilization, and decreasing power consumption within the wireless communications system 100.

Figure 2:
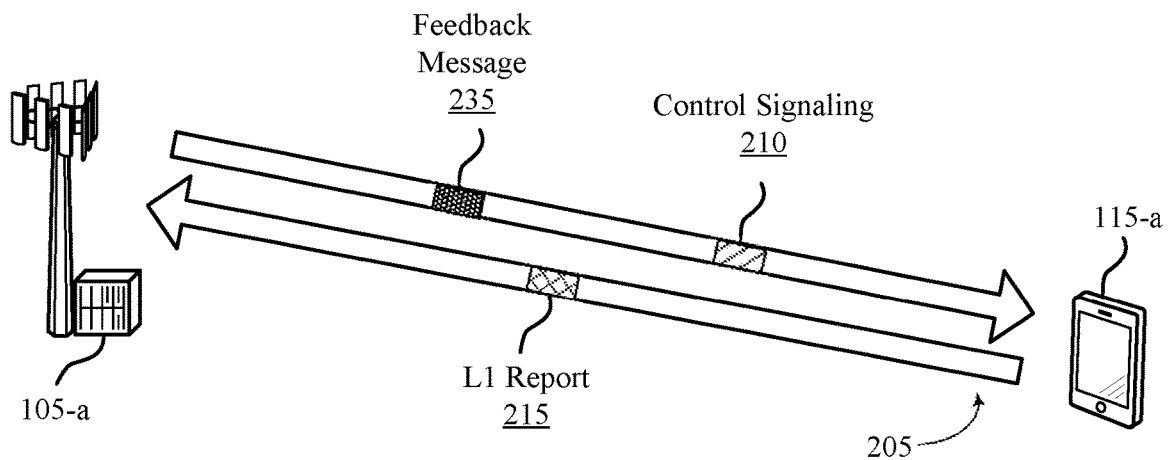
FIG. 2 illustrates an example of a wireless communications system that supports techniques for indicating panel information reports via beam reporting occasions in accordance with aspects of the present disclosure.
Figure 2:
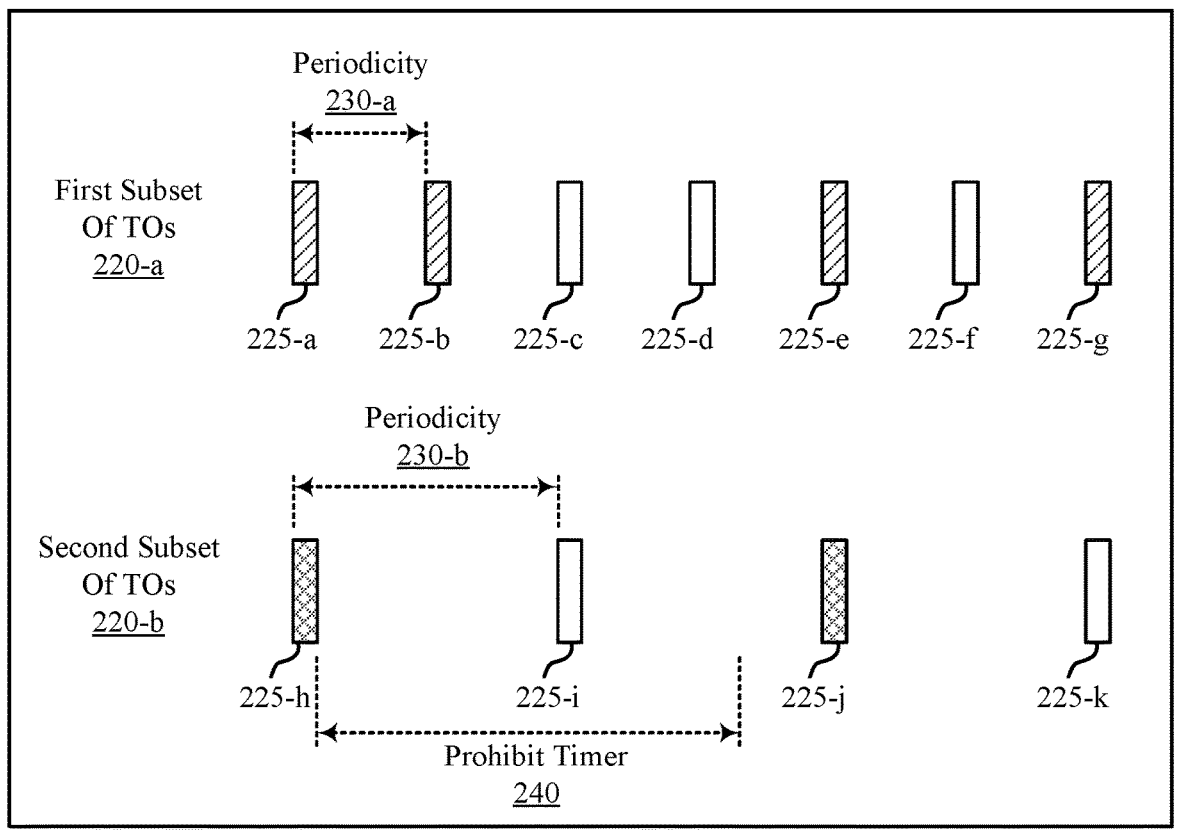

FIG. 2 illustrates an example of a wireless communications system 200 that supports techniques for indicating panel information reports via beam reporting occasions in accordance with aspects of the present disclosure. In some examples, wireless communications system 200 may implement, or be implemented by, aspects of wireless communications system 100. For example, wireless communications system 200 may support signaling, rules, and configurations which enable Legacy L1 reports (e.g., L1 reports including only beam information) and new L1 reports including antenna panel information (e.g., L1 reports including beam information and antenna panel information) to be transmitted with varying periodicities or regularities.

The wireless communications system 200 may include a network entity 105-*a* and a UE 115-*a*, which may be examples network entities 105 and UEs 115 as described with reference to FIG. 1. The UE 115-*a* may communicate with the network entity 105-*a* using a communication link 205, which may be an example of an NR or LTE link between the UE 115-*a* and the network entity 105-*a*. In some cases, the communication link 205 between the UE 115-*a* and the network entity 105-*a* may include an example of an access link (e.g., Uu link) which may include a bi-directional link that enables both uplink and downlink communication. For example, the UE 115-*a* may transmit uplink signals, such as uplink control signals or uplink data signals (e.g., SRSs), to one or more components of the network entity 105-*a* using the communication link 205, and one or more components of the network entity 105-*a* may transmit downlink signals, such as downlink control signals or downlink data signals, to the UE 115-*a* using the communication link 205.

As noted previously herein, in some wireless communications systems, UEs 115 may periodically measure reference signals from the network, and may transmit L1 reports including beam information. In particular, UEs 115 may measure other beam pairs (e.g., measure reference signals using other beam pairs), and indicate to the network (via L1 reports) whether other beam pairs exhibit better performance as compared to a currently-active beam pair.

Some wireless communications systems also enable UEs 115 to communicate antenna panel information to the network. For example, some wireless communications systems 100 enable UEs 115 to report a list of UE capability value sets to the network, where each UE capability value set includes/indicates the maximum supported number of sounding reference signal (SRS) ports (e.g., maximum quantity of supported SRS antenna ports). In some implementations, UEs 115 may support one or two antenna ports for SRS. In other implementations, UEs 115 may support more than two antenna ports for SRS. In some cases, at least one capability value needs to be different for any two different value sets. Additionally, or alternatively, identical value sets may be allowed in some wireless communications systems. Further, UE capability value set may be common across all BWPs and/or component carriers in a same band.

In some wireless communications systems, antenna panel information (e.g., UE capability value sets) may be reported to the network via L1 reports. That is, L1 reports may be used to indicate antenna panel information in addition to beam information. For example, some wireless communications systems enable UEs 115 to utilize L1 reports to communicate beam information and indicate maximum quantities of antenna ports supported at the UEs. For instance, a UE 115 may transmit an L1 report, where the L1 report indicates beam information and UE capability value sets (e.g., antenna panel information). For the purposes of the present disclosure, L1 reports including antenna panel information may generally be referred to as "new L1 reports" or "enhanced L1 reports."

In cases where a UE 115 reports a list of UE capability value sets (e.g., via L1 reports), and in order to facilitate UE-initiated antenna panel activation and selection, the correspondence between each reported CSI-RS and/or synchronization signal block (SSB) resource index and one of the UE capability value sets in the reported list is determined by the UE 115 and reported to the network via a beam reporting instance. The index of the corresponding UE capability value set may be reported along with the pair of SSB resource indicator (SSB-RI), CSI-RS resource indicator (CSI-RI), L1-reference signal received power (L1-RSRP), L1-SINR, or any combination thereof. Specifically, the index of the corresponding UE capability value set may be reported (with up to 4 pairs, with 7-bit absolute and 4-bit differential) in the beam reporting uplink control information (UCI).

Stated differently, a UE 115 may be configured to report the max number of supported SRS ports in a downlink beam report occasion (e.g., L1 report), along with beam information including, but not limited to, SSB-RI, CSI-RI, L1-RSRP, L1-SINR, or any combination thereof. In such cases, the network (e.g., one or more components of network entity 105) may be configured to associate the reported number of supported SRS ports with uplink transmission on the corresponding uplink/joint transmission configuration indicator states (e.g., CB-SRS/PUSCH on a TCI state using reported SSB/CSI-RS as source reference signal).

When reporting UE capability value sets (e.g., antenna panel information) via L1 reports, UEs 115 may be configured to down select (maintenance) between the several options. In accordance with a first option, a UE 115 can report one index for all the reported CSI-RIs and/or SSB-RIs in one beam reporting (e.g., via one L1 report). In accordance with a second option, a UE 115 can report one index for each reported CSI-RI and/or SSB-RI in one beam reporting (e.g., via one L1 report). In some cases, information reported via beam reporting instances (L1 reports) may take downlink-only panel information into account. Further, L1 reports may exhibit various time-domain behavior, including aperiodic reporting, periodic reporting, semi-persistent reporting, or any combination thereof. In some cases, semi-persistent and/or aperiodic reporting may be triggered only when periodic reporting is configured.

In some wireless communications systems, acknowledgment mechanisms (e.g., HARQ processes, HARQ behavior) of the network may vary according to the type of information included within respective L1 reports. For example, in some implementations, one or more components of the respective network entities 105 may be expected to transmit HARQ feedback (e.g., ACK/NACK) for all messages including antenna panel information, but may not be expected to transmit HARQ feedback in response to traditional L1 reports including only beam information. As such, some wireless communications systems 100 support acknowledgment mechanism of the reported correspondence from the network to the UE 115, which does not preclude reusing/reinterpreting existing signaling/procedures.

For example, when reporting antenna panel information via an L1 beam report, a UE 115 may first report a UE capability value set list as a maximum number of supported SRS ports (e.g., maximum number of supported antenna ports). For instance, the UE 115 may report, a capability value set list including a first capability value set (Set #0) that is able to support one SRS port, and a second capability value set (Set #1) that is able to support two SRS ports (e.g., UE capability value set list: Set #0={1 port}, Set #1={2 ports}). Subsequently, in a downlink beam report, the UE 115 may report the capability value set ID corresponding to the intended port number for a reported downlink reference signal. In other words, the UE 115 may report a capability set ID along with associated CSI-RI and/or SSB-RI. For instance, continuing with the example above, the UE 115 may report Set #0 associated with SSB #5.

Continuing with the same example, one or more components of the network entity may (optionally) transmit a feedback message (e.g., ACK) to the UE 115 in response to the report. Optionally, or additionally, the network entity 105 may update configurations based on the received report (e.g., configuration update). Following some application time at/associated with the UE 115, if applicable, the network entity 105 may schedule an SRS and/or PUSCH for codebook transmission (CB Tx) on the corresponding TCI state based on the reported capability at the UE 115 (e.g., based on the reported number of supported SRS ports).

There are several issues that arise when including antenna panel information (e.g., UE capability value sets, UE capability IDs) within L1 reports along with beam information. First, beam information may be updated much more frequently than antenna panel information. That is, channel conditions, and therefore beam information, may change much more frequently as compared to supported quantities of antenna ports at a UE 115. Semi-persistent L1 beam reports may need to be configured frequency in time in order to capture and keep up with channel dynamics. As such, traditional/legacy L1 reports including beam information may be transmitted up with a frequency/periodicity of one report (L1 report) per slot. Comparatively, panel-related capabilities (e.g., supported quantities of antenna ports) may not change as frequently in nature. In general, antenna panel information may change roughly once very hundreds of slots (e.g., 100 slots=12.5 ms at 120 kHz subcarrier spacing (SCS)). As such, including antenna panel information within every L1 report may be unnecessary, and result in increased signaling by the UEs 115.

Additionally, network entities 105 may be expected to transmit HARQ feedback (e.g., ACK/NACK) for all messages including antenna panel information, but may not be expected to transmit HARQ feedback in response to traditional L1 reports including only beam information. As such, including antenna panel information within every L1 report would also result in increased control signaling overhead (e.g., ACK/NACK) at the network entity. As such, the differences in relative frequencies at which beam information and antenna panel information is reported, along with the varying network-side HARQ behavior, results in scheduling issues when including antenna panel information within L1 reports.

Secondly, the ability of UEs 115 to skip certain L1 reports also results in challenges when including antenna panel information within L1 reports. In particular, for periodic and/or semi-persistent L1 CSI/beam reports, a UE 115 may skip certain reports based on UE implementation. For instance, a UE 115 may skip (e.g., refrain from transmitting) a traditional/legacy L1 report due to power saving considerations, or in cases where channel metrics remain stable (e.g., channel conditions/beam information are stable, or unchanged since the last L1 report). In the context of traditional/legacy L1 reports, there is no issue when a UE 115 elects to skip an L1 report, and the network entity 105 is not expected to transmit ACK/NAK in response to legacy L1 reports (and/or skipped legacy L1 reports).

Comparatively, in the context of reports (e.g., L1 reports) including antenna panel information, if a UE 115 skips a periodic and/or semi-persistent report, the network entity 105 will transmit a NACK and request re-transmission of the L1 report including antenna panel information. In other words, UEs 115 are expected to always transmit reports including panel information, as HARQ feedback (e.g., ACK/NACK) is expected at the network entity 105 in response to such reports. Accordingly, due to the fact that UEs 115 are not able to skip L1 reports that include antenna panel information, including antenna panel information within every L1 report would prevent the UE 115 from skipping L1 reports, thereby reducing/preventing power savings. Further, if UEs 115 are expected to transmit every L1 report (e.g., due to the presence of antenna panel information within the L1 reports), the UEs 115 may be expected to transmit L1 reports even in cases where there is little or no updates to the beam information and/or antenna panel information relative to previously-transmitted reports.

In order to address issues associated with skipping L1 reports, some UEs 115 may send short messages (e.g., one bit) to let the network entity 105 know that a particular L1 reporting occasion (e.g., CSI occasion) is skipped. However, full reports may exhibit different formats/payloads as compared to the short messages indicating that a report is skipped. That is, a full CSI message (or L1 report) may exhibit a different format and/or payload as compared to a message the UE 115 transmits when the full CSI message/L1 report is skipped. The varying formats therefore cause the network entity 105 to perform blind detection in order to identify/detect the short messages indicating that a report has been skipped, which adds complexity and processing resources at the network entity 105. Moreover, if a network entity 105 is unable to perform blind detection, the UE 115 may be expected to transmit a message/report including a same size of payload and/or same format, though power per bit can be adjusted when sending short message. Further, with such techniques, UEs 115 may still be expected to perform some transmission even in cases where a report is to be skipped, thereby reducing the power savings associated with skipping reports.

In this regard, the varying frequencies with which UEs 115 are to transmit beam reports and antenna panel information, along with the respective HARQ responses for beam reports and antenna panel information, result in challenges when including antenna panel information within L1 reports.

Accordingly, aspects of the present disclosure are directed to signaling, rules, and configurations which enable traditional/legacy L1 reports (e.g., L1 reports including only beam information) and/enhanced L1 reports including antenna panel information (e.g., L1 reports including beam information and antenna panel information) to be transmitted with varying periodicities or regularities.

In particular, aspects of the present disclosure provide various implementations which UEs 115 to transmit L1 reports 215 including antenna panel information. In some implementations, the network may aperiodically trigger L1 reports 215 to include antenna panel information, dynamically activate/deactivate resources used for enhanced L1 reports (e.g., L1 reports 215 including antenna panel information), or both. In additional or alternative implementations, the UE 115-a may be configured with separate sets of resources (e.g., separate sets of transmission occasions) for transmitting traditional/legacy L1 reports 215 (L1 reports 215 including beam information) and enhanced L1 reports 215 (L1 reports 215 including antenna panel information), respectively. In further implementations, the UE 115-a may be configured with rules or conditions which enable the UE 115-a to autonomously include/exclude antenna panel information from L1 reports 215.

Moreover, aspects of the present disclosure enable the network to exhibit varying HARQ behavior for L1 reports depending on the content of the respective L1 reports 215. In particular, aspects of the present disclosure may enable the network (e.g., network entity 105-a) to configure independent, separate HARQ processes for traditional/legacy L1 reports 215 including beam information, and enhanced L1 reports 215 including antenna panel information.

For example, in some implementations, antenna panel information (e.g., panel capability reports) may be included within aperiodic L1 reports 215. That is, the network entity 105-a may aperiodically schedule (e.g., via DCI signaling) an aperiodic L1 report 215 that is to include antenna panel information. For example, the UE 115-a may receive control signaling 210 (e.g., DCI message) that schedules an aperiodic L1 report 215. In this example, the control signaling 210 may include an indication that the UE 115-a is to include antenna panel information within the aperiodic L1 report 215. As such, in the case of aperiodic reporting, the aperiodic L1 report 215 may be triggered by one or more components of the network entity 105-a, and the antenna panel update is initialized by the UE 115-a. However, the use of aperiodic reporting for antenna panel information may be overly restrictive as compared to periodic and/or semi-persistent L1 reporting. Moreover, trigger states for aperiodic (e.g., aperiodic trigger states) may be limited (currently there are only four aperiodic trigger states). As such, the limited aperiodic trigger states may result in limited and infrequent L1 reporting.

In additional or alternative implementations, the UE 115-a may be configured with separate sets of transmission occasions 225 which are used to transmit traditional/legacy L1 reports and enhanced L1 reports, respectively. For example, as shown in FIG. 2, the UE 115-a may receive control signaling 210 (e.g., RRC signaling) from one or more components of the network entity 105-a (e.g., from the network entity 105-a as a standalone network entity or from one or more physically or logically separated network nodes that collectively implement the network entity 105-a in an O-RAN or VRAN architecture), where the control signaling 210 indicates a set of transmission occasions 225 for transmitting L1 reports 215. In particular, the control signaling 210 may indicate a first subset of transmission occasions 220-a which are associated with (e.g., dedicated for) transmission of traditional/legacy L1 reports 215 (e.g., L1 reports 215 including beam information), and a second subset of transmission occasions 220-b which are associated with (e.g., dedicated for) transmission of enhanced L1 reports 215 (e.g., L1 reports 215 including beam information and antenna panel information). In this regard, transmission occasions 225-a through 225-g included within the first subset of transmission occasions 220-a may be used by the UE 115-a to transmit traditional/legacy L1 reports 215, whereas the transmission occasions 225-h through 225-k may be used by the UE 115-a to transmit enhanced L1 reports 215 (e.g., L1 reports 215 including antenna panel information).

As shown in FIG. 2, the first subset of transmission occasions 220-a (including transmission occasions 225-a, 225-b, 225-c, 225-d, 225-e, 225-f, 225-g) may be associated with a first periodicity 230-a, and the second subset of transmission occasions 220-b (including transmission occasions 225-h, 225-i, 225-j, 225-k) may be associated with a second periodicity 230-b. In some implementations, the first periodicity 230-a may be greater than the second periodicity 230-b. In other words, the UE 115-a may be configured with subsets of transmission occasions 220-a, 220-b which enable traditional/legacy L1 reports 215 to be transmitted with a greater frequency/periodicity as compared to enhanced L1 reports 215 including antenna panel information. For instance, in some cases, the first periodicity 230-a may include every eight slots, whereas the second periodicity 230-b may include every 160 slots.

In some cases, the first subset of transmission occasions 220-a and the second set of transmission occasions 220-b may include separate sets of transmission occasions 225. That is, the transmission occasions 225-a through 225-g may be independent from (e.g., associated with different time/frequency resources) the transmission occasions 225-*h* through 225-*k*. Additionally, or alternatively, the second subset of transmission occasions 220-*b* may be included within the first subset of transmission occasions 220-*a*. In other words, in some cases, the second subset of transmission occasions 220-*b* may be a subset of the first subset of transmission occasions 220-*a*. For instance, in cases where the first subset of transmission occasions 220-*a* includes the second subset of transmission occasions 220-*b*, the transmission occasions 225-*a* and 225-*h* may be the same (e.g., same time/frequency resources), transmission occasions 225-*c* and 225-*i* may be the same, and transmission occasions 225-*g* and 225-*k* may be the same.

The respective subsets of transmission occasions 220-*a*, 220-*b* may be associated with one or more reporting configurations (reportConfigs). For example, in some cases, the UE 115-*a* may be configured with two separate reporting configurations: a first reporting configuration (e.g., reportConfig1) associated with the first subset of transmission occasions 220-*a*, and a second reporting configuration (e.g., reportConfig2) associated with the second subset of transmission occasions 220-*b*. In this example, the first reporting configuration (reportConfig1) may include a "report quantity" as regular/legacy L1 reports 215 (e.g., L1 reports 215 including beam information such as L1-RSRP, L1-SINR). Comparatively, the second reporting configuration (reportConfig2) may include a "report quantity" as enhanced L1 reports 215 (e.g., L1 reports 215 indicating L1-RSRP/SINR and maximum number of SRS ports). In such cases, the respective reporting configurations may be associated with different periodicities 230. For example, the first reporting configuration (reportConfig1) may be associated with the first periodicity 230-*a* (e.g., every eight slots), where the second reporting configuration (reportConfig2) may be associated with the second periodicity 230-*b* (e.g., every 160 slots).

However, the use of multiple reporting configurations may result in increased control signaling and RRC overhead. In particular, the use of two separate reporting configurations (e.g., reportConfig1, reportConfig2) for the respective subsets of transmission occasions 220-*a*, 220-*b* may result in two reportConfig entities in RRC, leading to higher RRC overhead. In other words, the use of separate reporting configurations may result in separate or additional RRC signaling (e.g., control signaling 210) to configure the respective reporting configurations.

Comparatively, in other implementations, a single reporting configuration at the UE 115-*a* may be configured with multiple periodicities 230. In other words, a single reporting configuration (reportConfig) may include two periodicities 230 associated with periodic/semi-persistent CSI reporting (e.g., L1 reporting) configured with panel information, including the first periodicity 230-*a* (e.g., eight slots) for legacy beam reporting, and the second periodicity 230-*b* (e.g., 160 slots) for enhanced L1 reports 215 (e.g., L1 reporting including beam report and panel report).

In this example, the second periodicity 230-*b* may be indicated via a downsampling factor (e.g., a factor of 20) in the reportConfig RRC (e.g., via the control signaling 210 including RRC signaling). Moreover, as noted previously herein, only the transmission occasions 225 associated with the second periodicity 230-*b* (e.g., transmission occasions 225 of the second subset of transmission occasions 220-*b*) may be used to report panel information (e.g., maximum quantity of supported antenna ports) to the network, whereas other transmission occasions 225 not associated with the second periodicity 230-*b* (e.g., transmission occasions 225 associated with the first periodicity 230-*a* of the first subset of transmission occasions 220-*a*) may only be used for legacy L1 reports 215 including beam reports.

Moreover, the network entity 105-*a* may be configured to transmit HARQ feedback (e.g., ACK/NACK) only for L1 reports 215 associated with the first periodicity. That is, the network entity 105-*a* may only transmit HARQ feedback for L1 reports 215 received within transmission occasions 225 of the second subset of transmission occasions 220-*b*, and may not transmit HARQ feedback for L1 reports 215 received within transmission occasions 225 of the first subset of transmission occasions 220-*a*.

In additional or alternative implementations, the network entity 105-*a* may not be expected to transmit feedback (e.g., ACK) in response to an L1 report 215 which does not include an update of antenna panel information relative to previously-received antenna panel information. For example, the UE 115-*a* may transmit enhanced L1 reports 215 via the transmission occasions 225-*h* and 225-*i*. In this example, if the antenna panel information transmitted via transmission occasion 225-*i* is the same as antenna panel information transmitted via transmission occasion 225-*h*, the network entity 105-*a* may not be expected to transmit a feedback message 235 in response to the L1 report 215 transmitted via the transmission occasion 225-*i*. However, the network entity 105-*a* may still transmit a NACK message (e.g., feedback message 235) if the network entity 105-*a* is missing a report within the second subset of transmission occasions 220-*b*, even if the respective L1 report 215 includes a legacy report without panel info. As such, the UE 115-*a* may still need to add panel related report into every L1 report 215 of the second subset of transmission occasions 220-*b*, even if panel information has not changed since a previously-transmitted L1 report (e.g., even if the L1 report 215 is not needed).

Feedback mechanisms for L1 reporting will be further shown and described with reference to FIG. 3.

In some implementations, the UE 115-*a* may be unable to skip L1 reports 215 associated with the second periodicity 230-*b* (e.g., L1 reports 215 scheduled to include antenna panel-related reports), but may be able to skip L1 reports 215 associated with the first periodicity 230-*a*. In other words, in cases where the control signaling 210 (e.g., RRC signaling) configures a single reporting configuration (reportConfig) including two periodicities 230-*a*, 230-*b*, the UE 115-*a* may be expected to transmit L1 reports 215 including antenna panel information within each transmission occasion 225 of the second subset of transmission occasions 220-*b*, but may be able to skip L1 reports 215 within the first subset of transmission occasions 220-*a*.

In additional or alternative implementations, the UE 115-*a* may be configured to autonomously include (or exclude) antenna panel information within L1 reports. In such cases, the UE 115-*a* may be configured with various rules, configurations, or conditions which enable the UE 115-*a* to determine whether or not to include antenna panel information within a respective L1 report 215. In other words, an L1 report 215 including antenna panel information (e.g., panel information report) may be initialized by the UE 115-*a*, where the UE 115-*a* is not expected to transmit antenna panel information within every transmission occasion 225 dedicated for enhanced L1 reports 215. In this regard, even in cases where the UE 115-*a* is configured with the second subset of transmission occasions 220-*b* (e.g., periodic/semi-persistent reporting) for enhanced L1 reports 215 including antenna panel information (e.g., L1 RSRP/SINR+max. SRS ports), the UE 115-*a* may not be expected to send antenna panel information (e.g., maximum quantity of supported SRS ports) in every report occasion.

For example, in cases where the control signaling 210 configures the second subset of transmission occasions 220-b for enhanced L1 reports 215, the UE 115-a may not be expected to transmit antenna panel information within every transmission occasion 225 of the second subset of transmission occasions 220-b. Rather, the UE 115-a may autonomously determine whether or not to include antenna panel information within L1 reports 215 transmitted in each transmission occasion 225 of the second subset of transmission occasions 220-b.

In some implementations, L1 reports 215 transmitted by the UE 115-a may indicate whether or not the respective L1 report 215 includes antenna panel information or not. For example, in some aspects, each L1 report may include one or more bit fields to indicate if panel information is, or is not, included within the respective L1 report 215. In this regard, in cases where the UE 115-a does not include antenna panel information within an L1 report 215 transmitted via the second subset of transmission occasions 220-b, the respective L1 report 215 may include an indication (e.g., bit field values) indicating that the respective L1 report 215 does not include antenna panel information.

In some aspects, the UE 115-a may be configured with a prohibit timer (e.g., reporting prohibit timer 240) which is usable for determining whether or not the UE 115-a will include antenna panel information within L1 reports 215 transmitted via the second subset of transmission occasions 220-b. In some aspects, the reporting prohibit timer 240 may be configured per reporting configuration (e.g., per report-Config), or may be the same for all reporting configurations associated with panel information.

In particular, the UE 115-a may be configured to refrain from transmitting L1 reports 215 within the second subset of transmission occasions 220-b while the reporting prohibit timer 240 is active. Additionally, or alternatively, the UE 115-a may be configured to refrain from including antenna panel information within L1 reports 215 within transmitted within the second subset of transmission occasions 220-b while the reporting prohibit timer 240 is active. In this regard, the reporting prohibit timer 240 may configured to prevent frequent panel information reports (e.g., reduce a frequency with which the UE 115-a reports antenna panel information).

For example, in some implementations, the control signaling 210 may configure a reporting prohibit timer 240 at the UE 115-a. That is, the control signaling 210 may indicate an active duration and/or trigger conditions for initiating the reporting prohibit timer 240. In this example, the UE 115-a may initiate the reporting prohibit timer 240 based on transmitting an L1 report 215 including antenna panel information within the transmission occasion 225-h, in response to receiving a feedback message 235 (e.g., ACK message) in response to an enhanced L1 report 215, or both. In such cases, the UE 115-a may refrain from transmitting enhanced L1 reports 215 within the second subset of transmission occasions 220-a while the reporting prohibit timer 240 is active. For instance, as shown in FIG. 2, the UE 115-a may refrain from transmitting an L1 report 215 within the transmission occasion 225-i based on the transmission occasion 225-i being positioned within the active duration of the reporting prohibit timer 240 in the time domain.

Additionally, or alternatively, the UE 115-a may be configured to simply refrain from including antenna panel information within L1 reports 215 transmitted while the reporting prohibit timer 240 is active. For example, in alternative implementations, the UE 115-a may transmit an L1 report 215 within the transmission occasion 225-i, but may refrain from including antenna panel information within the L1 report. In this example, the network entity 105-a may not be expected to transmit a feedback message 235 (e.g., ACK/NACK) to the L1 report 215 transmitted within the transmission occasion 225-i due to the fact that the L1 report 215 does not include antenna panel information (despite the L1 report 215 being transmitted via the second subset of transmission occasions 220-b).

In additional or alternative implementations, the network entity 105-a may be configured to dynamically select whether a panel report (e.g., antenna panel information) is to be included within a periodic/semi-persistent L1 report 215. In other words, the network entity 105-a may dynamically indicate whether the UE 115-a is to include antenna panel information within L1 reports 215 transmitted via the seconds subset of transmission occasions 220-b.

For example, in cases where the UE 115-a is configured with the second subset of transmission occasions 220-b for enhanced L1 reports 215 (e.g., report quantity is configured as "L1 RSRP/SINR+max. SRS ports"), the network entity 105-a may transmit a flag bit to control whether UE 115-a should add an antenna panel report into an L1 report 215 (e.g., L1 beam report) transmitted via the second subset of transmission occasions 225. In some cases, the one or more bits indicating whether the UE 115-a is to include antenna panel information within L1 reports 215 may be included within the RRC IE (e.g., control signaling 210) of the reporting configuration (reportConfig). In such cases, the network entity 105-a may be configured to dynamically enable/disable (e.g., turn on/off) the flag bit for including antenna panel information within L1 reports 215 via DCI messages, MAC-CE messages, or both. For example, the control signaling 215 may configure the second subset of transmission occasions 220-b for enhanced L1 reports 215, but may set a flag bit such that the UE 115-a does not include antenna panel information within L1 reports 215 transmitted via the second subset of transmission occasions 220-b. In such cases, the network entity 105-a may not transmit ACK/NACK in response to L1 reports 215 received via the second subset of transmission occasions 220-b (due to the absence of panel information). Subsequently, a DCI message and/or MAC-CE may dynamically enable the flag bit to instruct the UE 115-a to begin including antenna panel information within L1 reports 215 transmitted within the second subset of transmission occasions 220-b. Once enabled, the UE 115-a may not be able to skip transmitting L1 reports 215 carrying antenna panel information. However, implementations which enable the network entity 105 to dynamically enable/disable inclusion of panel information may result in higher signaling overhead form the network entity 105-a. Moreover, the network entity 105-a, may not know when the UE capability changes (e.g., does not know when the UE 115-a is able to support an increased/decreased quantity of antenna ports).

In some implementations, the network entity 105-a may be configured to schedule wireless communications between the UE 115-a and the network entity 105-a and/or adjust communications parameters at the UE 115-a (e.g., TCI states, TCI codepoints) based on received L1 reports 215. In this regard, the UE 115-a may receive control signaling scheduling a wireless communication between the UE 115-a and the network entity 105-a based on transmitting an L1 report 215, and may perform the scheduled wireless communications in accordance with the received control signaling.

For instance, the UE 115-*a* may receive a control message scheduling a communication between the UE 115-*a* and the network entity 105-*a* in response to an enhanced L1 report 215 transmitted via the second subset of transmission occasions 220-*b*. In this example, the UE 115-*a* may perform the scheduled communication in accordance with (e.g., using) the quantity of antenna ports supported at the UE 115-*a* which were indicated via the L1 report 215. By way of another example, a feedback message 235 received in response to the L1 report 215 may indicate for the UE 115-*a* to adjust TCI states/TCI codepoints at the UE 115-*a*. In this example, the UE 115-*b* may be configured to perform subsequent communications in accordance with the indication of the TCI states/TCI codepoints received via the feedback message 235. Information included within feedback messages 235 responsive to L1 reports will be further shown and described with reference to FIG. 3.

Techniques described herein may enable traditional/ legacy L1 reports 215 (e.g., L1 reports 215 including beam information) to be communicated at a different periodicity or regularity as compared to new L1 reports 215 including antenna panel information. In particular, techniques described herein may enable the UE 115-*a* to communicate beam information via L1 reports 215 more frequently than antenna panel information. In this regard, techniques described herein may reduce a frequency at which the UE 115 must report antenna panel information, thereby reducing signaling and power consumption at the UE 115, and leading to a more efficient use of resources within the wireless communications system 200. Moreover, due to the fact that the network entity 105-*a* may be expected to transmit HARQ feedback in response to antenna panel information, by reducing a frequency with which antenna panel information is communicated via L1 reports 215, techniques described herein may reduce HARQ signaling at the network entity 105-*a*, further reducing control signaling overhead, improving resource utilization, and decreasing power consumption within the wireless communications system 200.

Figure 3:
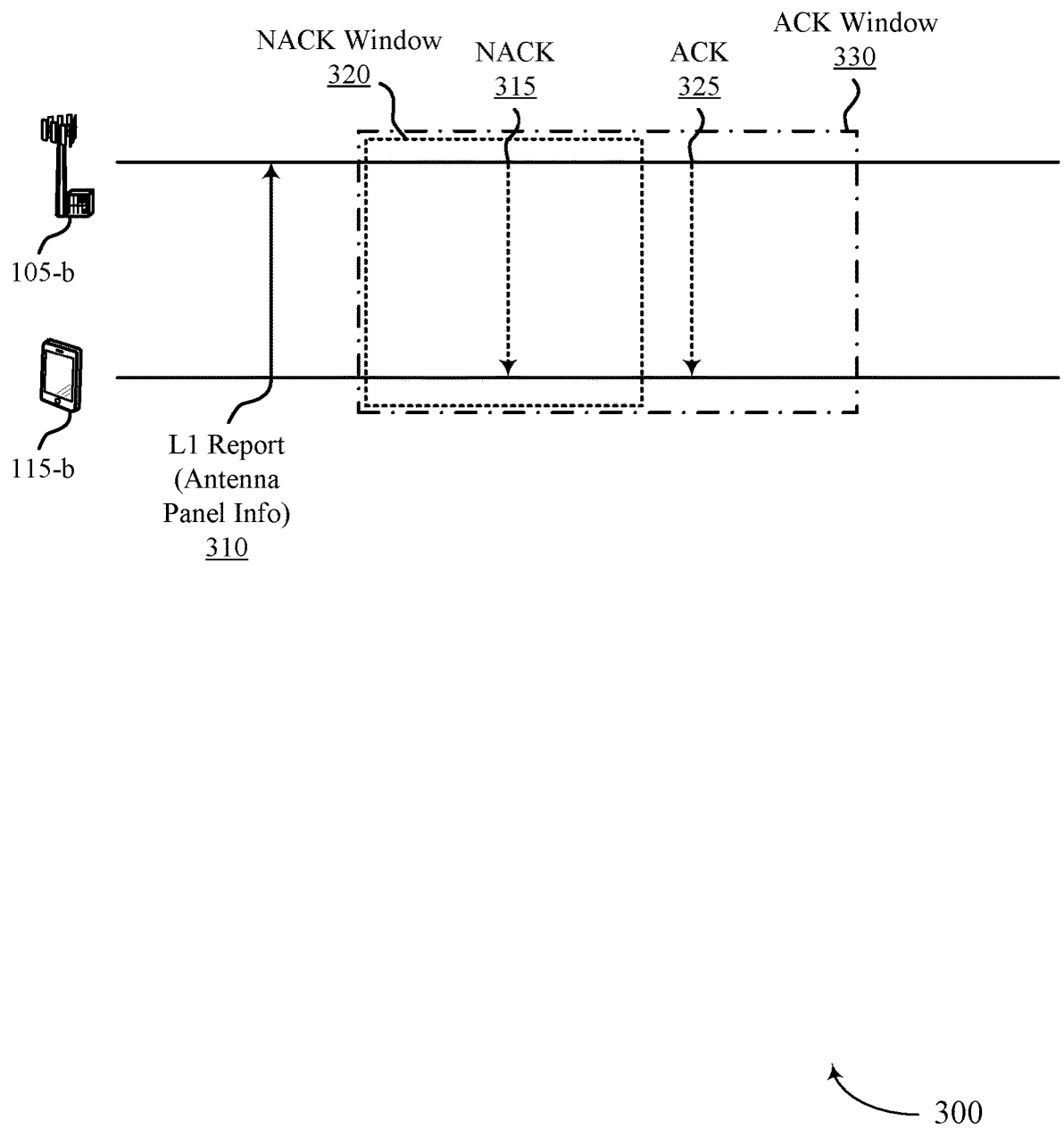
FIG. 3 illustrates an example of a resource configuration that supports techniques for indicating panel information reports via beam reporting occasions in accordance with aspects of the present disclosure.

FIG. 3 illustrates an example of a resource configuration 300 that supports techniques for indicating panel information reports via beam reporting occasions in accordance with aspects of the present disclosure. Aspects of resource configuration 300 may implement, or be implemented by, aspects of wireless communications system 100, wireless communications system 200, or both.

As shown in FIG. 3, a UE 115-*c* may transmit an L1 report 310 including antenna panel information (e.g., enhanced L1 report 310). In such cases, the UE 115-*b* may be configured to monitor for NACK messages 315 within a NACK window 320, where the NACK window 320 follows transmission of the L1 report 310 in the time domain. NACK messages 315 received within the NACK window 320 may indicate that the network entity 105-*b* did not successfully receive an expected L1 report 310 including antenna information, and may request re-transmission of the L1 report 310 including antenna panel information. As such, the UE 115-*b* may be configured to re-transmit the L1 report 310 in cases where the UE 115-*b* receives a NACK message 315 within the NACK window 320.

Similarly, the UE 115-*b* may be configured to monitor for ACK messages 325 within an ACK window 330, where the ACK window 330 follows transmission of the L1 report 310 in the time domain. In some cases, the ACK window 330 may be longer in the time domain as compared to the NACK window 320 to provide the network entity 105-*b* with more flexibility when transmitting feedback messages. ACK messages 325 received within the ACK window 330 may indicate that the network entity 105-*b* successfully received the expected L1 report 310 including antenna information. ACK messages 325 received within the ACK window 330 may include dedicated ACK signaling, may re-use existing L1/L2 configuration signaling, or both. Moreover, in some implementations, the UE 115-*a* may be configured to monitor for only NACK messages 315 or only ACK messages 325.

The network entity 105-*b* may have several options when transmitting NACK messages 315 in cases where the network entity 105-*b* does not successfully receive an expected L1 report 310 including antenna panel information. In accordance with a first option, the network entity 105-*a* may transmit a DCI message to trigger an aperiodic report as retransmission. In such cases, the DCI message may serve as a NACK message 315 to trigger re-transmission of the L1 report 310. In some cases where the original L1 report 310 is an aperiodic report, the DCI message may simply indicate for the UE 115-*b* to re-transmit the L1 report 310.

Comparatively, in cases where the original L1 report 310 is a periodic/semi-persistent report (e.g., transmitted within periodic transmission occasions or semi-persistent transmission occasions, such as the second subset of transmission occasions 220-*b*), the DCI message may indicate which L1 report the UE 115-*b* is to retransmit. Such indications may be indicated using a reserved index in a CSI request field, using a combination of special sequence and RNTI in an existing DCI format, or both. For example, the DCI message (e.g., NACK message 315) may use SP-CSI-RNTI and DCI format 0_1 for a validation sequence, in which a CSI request and UL-SCH field are all '0,' and a HARQ ID field indicates a reporting configuration (e.g., reportConfig) associated with the requested retransmission, and where TDRA/FDRA fields within the DCI message indicate resources usable by the UE 115-*b* for re-transmitting the L1 report 310.

In accordance with a second option, the network entity 105-*a* may indicate a NACK by using different sequences in a CSI-RS occasion associated with the reporting configuration (e.g., reportConfig) corresponding to the expected L1 report 310. In such cases, retransmission may be triggered in the next report occasion, or in a preconfigured resource.

Similarly, just as there are different options for indicating NACK, the network entity 105-*b* may additionally have multiple different options for indicating ACK (e.g., ACK messages 325) in cases where the network entity 105-*b* successfully receives the L1 report 310 including antenna panel information. In accordance with a first option, the network entity 105-*b* may transmit dedicated ACK signaling (e.g., dedicated ACK messages 325). For example, in some cases, the network entity 105-*b* may transmit a DCI message including a special sequence just for the purposes of indicating an ACK. By way of another example, the network entity 105-*b* may transmit a DCI message and/or MAC-CE message with additional fields or bits which indicate an ACK responsive to the L1 report 310. In such cases, the DCI messages and/or MAC-CE messages may be regarded as feedback messages responsive to the L1 report 310.

In some aspects, feedback messages (e.g., DCI, MAC-CE) may indicate a TCI update for the UE 115-*b*. For example, in some cases, DCI/MAC-CE messages received in response to the L1 report 310 may indicate a TCI update using a reserved sequence, field, and/or codepoint, which indicates an acknowledgment of the L1 report 310. In other words, a DCI/MAC-CE may indicate one or more TCI states and/or TCI codepoints for the UE 115-*b*, thereby indicating whether the UE 115-*b* is to continue using the same TCI states/TCI codepoints, or switch to different TCI states/TCI codepoints. In some implementations, the DCI/MAC-CE may indicate a change of sequence in a CSI-RS occasion associated with the L1 report 310.

For example, after sending the L1 report 310 carrying panel capability information (e.g., antenna panel information, quantities of supported antenna ports), the UE 115-*b* may monitor for ACK messages 325 within the ACK window 330. In such cases, a received ACK message 325 may include a TCI update DCI message, where the updated TCI is associated with the L1 report 310. For instance, the L1 report 310 may include a beam report such as CSI-RS, an SSB ID and RSRP information, and the like. In such cases, a DCI message received by the UE 115-*b* may indicate a TCI update, where the updated TCI is associated with (e.g., uses) one of the CSI-RS and/or SSBs as a source reference signal. The network entity 105-*b* may use this type of feedback message (e.g., TCI update DCI) when the network entity 105-*b* wants to change TCI states based on the received L1 report 310.

By way of another example, after transmitting the L1 report 310, the UE 115-*b* may receive a DCI message including a predefined codepoint in the TCI state. In such cases, the predefined codepoint may include a reserved codepoint (e.g., all '0s) which does not point to any specific TCI state. In this regard, the reserved codepoint may indicate that the network entity 105-*b* received the L1 report 310, but does not want to perform any TCI state update based on the L1 report 310.

Figure 4:
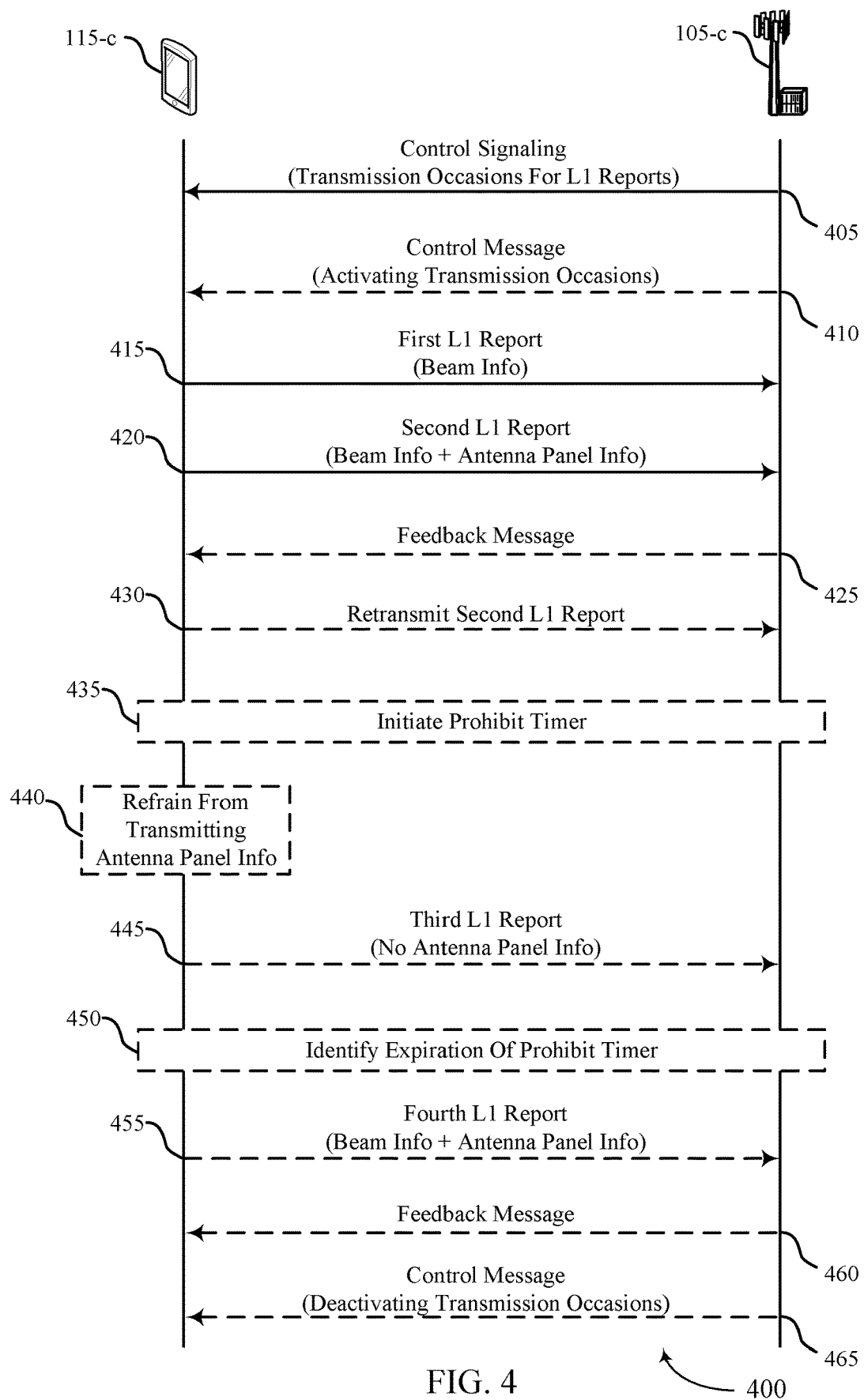
FIG. 4 illustrates an example of a process flow that supports techniques for indicating panel information reports via beam reporting occasions in accordance with aspects of the present disclosure.

FIG. 4 illustrates an example of a process flow 400 that supports techniques for indicating panel information reports via beam reporting occasions in accordance with aspects of the present disclosure. In some examples, process flow 400 may implement, or be implemented by, aspects of wireless communications system 100, wireless communications system 200, resource configuration 300, or any combination thereof. For example, the process flow 400 illustrates a UE 115-*c* being configured with separate sets of transmission occasions for (1) traditional/legacy L1 reports, and (1) enhanced L1 reports including antenna panel information, and transmitting L1 reports within the respective sets of transmission occasions, as described with reference to FIGS. 1-3.

In some cases, process flow 400 may include a UE 115-*c* and a network entity 105-*c*, which may be examples of corresponding devices as described herein. In particular, the UE 115-*c* and the network entity 105-*c* illustrated in FIG. 4 may include examples of the UE 115-*a* and the network entity 105-*a*, respectively, as illustrated in FIG. 2.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-*c* may receive, from one or more components of the network entity 105-*c*, control signaling which indicates a set of transmission occasions usable by the UE 115-*c* for transmitting L1 reports. In some aspects, the set of transmission occasions may include a first subset of transmission occasions for transmitting beam information reports, and a second set of transmission occasions for transmitting beam information reports and corresponding antenna panel information. In other words, the control signaling may indicate a first subset of transmission occasions for transmitting traditional/legacy L1 reports including beam information, and a second subset of transmission occasions for transmitting enhanced L1 reports including antenna panel information. In some aspects, the control signaling at 405 may include RRC signaling, system information message(s), DCI signaling, MAC-CE signaling, or any combination thereof.

In some aspects, the first and second subsets of transmission occasions may be configured with different periodicities. For example, the first subset of transmission occasions may be associated with a first periodicity, and the second subset of transmission occasions may be associated with a second periodicity that is different from the first periodicity. In this regard, the UE 115-*c* may be configured to transmit traditional/legacy L1 reports with a different periodicity/ frequency as compared to enhanced L1 reports. In particular, in some implementations, the first periodicity may be shorter than (e.g., exhibit a greater frequency) the second periodicity, such that the UE 115-*c* is configured to transmit traditional/legacy L1 reports more frequently than enhanced L1 reports. For example, the first periodicity may enable the UE 115-*c* to transmit traditional/legacy L1 reports every eight slots, and the second periodicity may enable the UE 115-*c* to transmit enhanced L1 reports every 160 slots.

In some implementations, the control signaling may configure the subsets of transmission occasions via one or more reporting configurations (e.g., one or more reportConfigs). For example, in some cases, the control signaling may include an RRC message associated with (or indicating) a reporting configuration (reportConfig), where the reporting configuration is associated with, or includes, the first periodicity for the first subset of transmission occasions and the second periodicity associated with the second subset of transmission occasions. In additional or alternative implementations, the UE 115-*c* may receive one or more RRC messages indicating multiple reporting configurations, where each reporting configuration is associated with a single periodicity. For example, the UE 115-*c* may receive a first RRC message associated with (indicating) a first reporting configuration (e.g., reportConfig1) and a second RRC message associated with a second reporting configuration (e.g., reportConfig2), where the first and second reporting configurations are associated with the first and second periodicities, respectively. In this example, the first reporting configuration (e.g., reportConfig1) may be associated with reporting traditional/legacy L1 reports (e.g., eight slot periodicity), where the second reporting configuration (e.g., reportConfig2) may be associated with reporting enhanced L1 reports including antenna panel information (e.g., 160 slot periodicity).

In some implementations, the first and second subsets of transmission occasions may include separate, independent transmission occasions. In alternative implementations, the second subset of transmission occasions may be included within the first subset of transmission occasions. In other words, the second subset of transmission occasions may be a subset of the first subset of transmission occasions. In such cases, a some of the transmission occasions within the first subset of transmission occasions may be designated for transmission of enhanced L1 reports.

As noted previously herein, in some implementations, the UE 115-*c* may be able to skip L1 reports in the first subset of transmission occasions, but may be unable to skip L1 reports in the second subset of transmission occasions. That is, the UE 115-*c* may be able to skip sending traditional/ legacy L1 reports, but may be unable to skip sending enhanced L1 reports. In additional or alternative implementations, the UE 115-c may be configured to autonomously determine/select when to transmit enhanced L1 reports. In such cases, the control signaling at 405 may indicate additional parameters usable by the UE 115-c for determining which transmission occasions from the second subset of transmission occasions will be used to transmit antenna panel information. For example, in some cases, the control signaling may indicate a reporting prohibit timer that is usable for determining when the UE 115-c will include antenna panel information within the second subset of transmission occasions. The reporting prohibit timer will be discussed in further detail with respect to steps 435-450 of process flow 400.

At 410, the UE 115-c may receive, from one or more components of the network entity 105-c, a control message (e.g., DCI message, MAC-CE message) which activates L1 transmission occasions which were configured via the control signaling (e.g., RRC signaling) at 405.

For example, in some cases, RRC signaling at 405 may indicate a first subset of transmission occasions for transmitting traditional/legacy L1 reports including beam information, and a second subset of transmission occasions for transmitting enhanced L1 reports including antenna panel information. In this example, the second subset of transmission occasions may originally be configured in a deactivated state, and the control message (e.g., DCI message, MAC-CE message) at 410 may activate the second subset of transmission occasions to enable the UE 115-c to transmit enhanced L1 reports using the second subset of transmission occasions. In additional or alternative implementations, second subset of transmission occasions may be originally configured in an active state (e.g., the control signaling at 405 activates the second subset of transmission occasions).

At 415, the UE 115-c may transmit, to one or more components of the network entity 105-c, a first L1 report including a first beam information report. In some aspects, the UE 115-c may transmit the first L1 report via a transmission occasion of the first subset of transmission occasions which were configured via the control signaling at 405. In other words, the UE 115-c may transmit a traditional/legacy L1 report including beam information via the first subset of transmission occasions dedicated for traditional/legacy L1 reports.

In some aspects, the UE 115-c may transmit the first L1 report at 415 based on receiving the control signaling at 405, receiving the control message at 410, or both. For example, in some aspects, the UE 115-c may transmit the first L1 report in accordance with the first periodicity associated with the first subset of transmission occasions which was configured via the control signaling at 405. Moreover, the UE 115-c may transmit the first L1 report in accordance with a reporting configuration (e.g., reportConfig, reportConfig1) associated with traditional/legacy L1 reports.

By way of another example, in some cases, the control signaling at 405 (and/or additional control signaling) may indicate or configure a set of resources for reference signals used for generating beam information reports. In such cases, the UE 115-c may receive reference signals (e.g., SRSs) from one or more components of the network entity 105-c within the indicated/configured resources, and may generate the first beam information report included within the first L1 report based on the measurements performed on the received reference signals.

As noted previously herein, in some implementations, the network entity 105-c may not be configured to transmit ACK/NACK feedback in response to traditional/legacy L1 reports. In this regard, the UE 115-c may not expect ACK/NACK in response to the first L1 report, and may therefore refrain from monitoring for ACK/NACK feedback responsive to the first L1 report. Furthermore, in some implementations, the UE 115-c may be configured to (autonomously) skip transmission occasions within the first subset of transmission occasions. In other words, the UE 115-c may be able to refrain from transmitting traditional/legacy L1 reports within transmission occasions in the first subset of transmission occasions, such as in cases where beam information has not changed (or has only slightly changed) since a previously-transmitted L1 report.

At 420, the UE 115-c may transmit, to one or more components of the network entity 105-c, a second L1 report including a second beam information report and corresponding antenna panel information (e.g., an indication of a quantity of antenna ports supported by the UE 115-c). In some aspects, the UE 115-c may transmit the second L1 report via a transmission occasion of the second subset of transmission occasions which were configured via the control signaling at 405. In other words, the UE 115-c may transmit an enhanced L1 report including beam information and antenna panel information (e.g., maximum quantity of supported SRS ports) via the second subset of transmission occasions dedicated for enhanced L1 reports. In some aspects, the second L1 report may include an indication (e.g., via one or more bit fields) that the second L1 report includes antenna panel information.

In some aspects, the UE 115-c may transmit the second L1 report at 420 based on receiving the control signaling at 405, receiving the control message at 410, transmitting the first L1 report at 415, or any combination thereof. For example, in some aspects, the UE 115-c may transmit the second L1 report in accordance with the second periodicity associated with the second subset of transmission occasions which was configured via the control signaling at 405. Moreover, the UE 115-c may transmit the second L1 report in accordance with a reporting configuration (e.g., reportConfig, reportConfig2) associated with enhanced L1 reports.

By way of another example, as noted previously herein, the control signaling at 405 (and/or additional control signaling) may indicate or configure a set of resources for reference signals used for generating beam information reports. In such cases, the UE 115-c may receive reference signals (e.g., SRSs) from one or more components of the network entity 105-c within the indicated/configured resources, and may generate the second beam information report included within the second L1 report based on the measurements performed on the received reference signals. Moreover, in some implementations, the UE 115-c may utilize the same set of resources/reference signals to generate L1 reports transmitted via the first and second subsets of transmission occasions. In other words, the UE 115-c may be configured with a single set of resources usable for receiving reference signals, where the UE 115-c performs measurements on the received reference signals to generate both (1) the first L1 report (e.g., traditional/legacy L1 report), and (2) the second L1 report (e.g., enhanced L1 report including antenna panel information).

As compared to the first L1 message, in which case the network entity 105-c is not configured to transmit ACK/NACK feedback, the network entity 105-c may be configured to transmit ACK/NACK in response to enhanced L1 reports including antenna panel information. In this regard, In this regard, the UE 115-c may expect to receive ACK/

NACK feedback in response to the second L2 report, and may therefore monitor for ACK/NACK feedback responsive to the second L2 report.

At 425, the UE 115-*c* may receive a feedback message (e.g., ACK/NACK) responsive to the second L1 report. In particular, the UE 115-*c* may expect to receive feedback in response to enhanced L1 reports, monitor for feedback messages after transmitting the second L1 report, and receive the feedback message based on the monitoring.

In some cases, the feedback message at 425 may include a control message received in response to the second L1 report. For example, in some cases, the UE 115-*c* may receive a DCI message and/or MAC-CE message responsive to the second L1 report. In some aspects, the control message (e.g., DCI) may include an acknowledgment of the second L1 report. Additionally, or alternatively, the control message may indicate one or more updated TCI states associated with the second beam information report, the quantity of antenna ports, or both, which were indicated via the second L1 report. Similarly, in some implementations, the control message (e.g., DCI message) received in response to the second L1 report may indicate a TCI codepoint associated with an acknowledgment of the second L1 report. In this regard, in some cases, TCI states and/or TCI codepoints may serve as an acknowledgment of the second L1 report, and may indicate that the UE 115-*c* is to use the same or different TCI, as discussed with reference to FIG. 3.

In cases where the feedback message at 425 includes an ACK message, the process flow 400 may proceed to step 435. Comparatively, in cases where the feedback message at 425 includes a NACK message, the process flow 400 may proceed to step 430.

At 430, the UE 115-*c* may re-transmit the second L1 report including the second beam information report and the antenna panel information (e.g., maximum number of supported antenna ports). Stated differently, the UE 115-*c* may transmit a third L1 report including the same information which was included within the second L1 report transmitted at 420. In particular, the UE 115-*c* may re-transmit the second L1 report (e.g., transmit a third L1 report) at 430 based on (in response to) receiving a NACK message at 425. In some cases, the UE 115-*c* may re-transmit the second L1 report at 430 within a subsequent transmission occasion from the second subset of transmission occasions. In other implementations, the UE 115-*c* may re-transmit the second L1 report within a different set of resources not included within the second subset of transmission occasions (e.g., based on a grant received from one or more components of the network entity 105-*c*).

At 435, the UE 115-*c*, the network entity 105-*c*, or both, may initiate a reporting prohibit timer. As noted previously herein, the UE 115-*c* may utilize the reporting prohibit timer to determine when the UE 115-*c* should include antenna panel information within L1 reports. In other words, the reporting prohibit timer may be used to determine when the UE 115-*c* should include antenna panel information within L1 reports, and when the UE 115-*c* should refrain from including antenna panel information within L1 reports. The UE 115-*c* and/or network entity 105-*c* may initiate the reporting prohibit timer based on transmitting/receiving the control signaling at 405, transmitting/receiving the control message at 410, transmitting/receiving the first L1 report at 415, transmitting/receiving the second L1 report at 420, transmitting/receiving the feedback message at 425, transmitting/receiving the re-transmission of the second L1 report at 430, or any combination thereof.

For example, in cases where the control signaling at 405 configures the reporting prohibit timer (e.g., indicates a duration and/or trigger conditions for the reporting prohibit timer), the UE 115-*c* may initiate the reporting prohibit timer based on the control signaling. Moreover, the UE 115-*c* may initiate the reporting prohibit timer based on transmitting the antenna panel information within the second L1 report at 420 and/or the re-transmission of the second L1 report at 430.

The reporting prohibit timer may be used to determine when the UE 115-*c* should include antenna panel information within L1 reports, and when the UE 115-*c* should refrain from including antenna panel information within L1 reports. As such, upon initiating the reporting prohibit timer at 435, the process flow 400 may proceed to step 440, step 445, or both.

At 440, the UE 115-*c* may refrain from transmitting enhanced L1 reports, refrain from including antenna panel information within L1 reports, or both. In particular, the UE 115-*c* may refrain from transmitting enhanced L1 reports and/or including antenna panel information within L1 reports during an active duration of the reporting prohibit timer. Moreover, the network entity 105-*c* may not expect to receive antenna panel information within L1 reports received while the reporting prohibit timer is active.

For example, as shown in FIG. 2, in cases where there is a transmission occasion within the second subset of transmission occasions which falls within the active duration of the reporting prohibit timer, the UE 115-*c* may refrain from transmitting an L1 report within the respective transmission occasion, refrain from including antenna panel information within an L1 report transmitted within the respective transmission occasion, or both. In this regard, the reporting prohibit timer may reduce a frequency with which the UE 115-*c* communicates antenna panel information.

At 445, the UE 115-*c* may transmit a third L1 report, where the third L1 report does not include antenna panel information. In particular, the UE 115-*c* may refrain from including antenna panel information within the third L1 report based on the third L1 report being transmitted within the active duration of the reporting prohibit timer (e.g., while the reporting prohibit timer is active). Moreover, the network entity 105-*c* may not expect to receive antenna panel information within L1 reports received while the reporting prohibit timer is active.

For example, the UE 115-*c* may transmit a third L1 report within the second subset of transmission occasions and while the reporting prohibit timer is active, where the third L1 report does not include antenna panel information. In other words, the UE 115-*c* may not include antenna panel information within the third L1 report based on the third L1 report being transmitted after activation/initiation and prior to expiration of the reporting prohibit timer in the time domain. In some implementations, the third L1 report at 445 may include a third beam information report and an indication that the third L1 report does not include antenna panel information. For instance, L1 reports, including the third L1 report, may include one or more bit fields which are used to indicate whether the respective L1 reports include antenna panel information or not.

At 450, the UE 115-*c*, the network entity 105-*c*, or both, may identify an expiration of the reporting prohibit timer. The expiration of the reporting prohibit timer may be determined based on the activation/initiation of the reporting prohibit timer at 435 and an active duration of the reporting prohibit timer (which may be configured via the control signaling at 405). Following expiration of the reporting prohibit timer, the UE 115-*c* may be able to resume including antenna panel information within L1 reports transmitted via the second subset of transmission occasions. Similarly, the network entity 105-*c* may expect to receive antenna panel information within L1 reports received within transmission occasions of the second subset of transmission occasions.

At 455, the UE 115-*c* may transmit a fourth L1 report via the second subset of transmission occasions, where the fourth L1 report includes a beam information report and antenna panel information (e.g., quantity of supported SRS ports). In particular, the UE 115-*c* may transmit the fourth L1 report via the second subset of transmission occasions dedicated for enhanced L1 reports based on identifying the expiration of the reporting prohibit timer at 450. In some aspects, the fourth L1 report may include an indication (e.g., via one or more bit fields) that the fourth L1 report includes antenna panel information.

Additionally, the UE 115-*c* may transmit the fourth L1 report in accordance with information included within the control signaling at 405, including the second periodicity associated with the second subset of transmission occasions, the reporting configuration (e.g., reportConfig, reportConfig2) associated with enhanced L1 reports, or both. For example, the UE 115-*c* may transmit the fourth L1 report within a first transmission occasion of the second subset of transmission occasions following the expiration of the reporting prohibit timer.

At 460, the UE 115-*c* may receive a feedback message responsive to the fourth L1 report. In particular, the UE 115-*c* may expect to receive feedback in response to enhanced L1 reports, monitor for feedback messages after transmitting the fourth L1 report, and receive the feedback message based on the monitoring. As noted previously herein with respect to step 425 of process flow 400, the feedback message may include an ACK message, a NACK message, a control message (e.g., control message indicating TCI states, TCI codepoints), or any combination thereof. As such, any description associated with the feedback message at 425 may be regarded as applying to the feedback message at 460, unless noted otherwise herein.

In some implementations, the network entity 105-*c* may be configured to schedule wireless communications between the UE 115-*c* and the network entity 105-*c* and/or adjust communications parameters at the UE 115-*c* (e.g., TCI states, TCI codepoints) based on received L1 reports (e.g., first L1 report at 415, second L1 report at 420 and 430, third L1 report at 445, fourth L1 report at 455). In this regard, the UE 115-*c* may receive control signaling scheduling a wireless communication between the UE 115-*c* and the network entity 105-*c* based on transmitting any of the L1 reports described in process flow 400, and may perform the scheduled wireless communications in accordance with the received control signaling.

For instance, the UE 115-*c* may receive a control message scheduling a communication between the UE 115-*c* and the network entity 105-*c* in response to the fourth L1 report at 455. In this example, the UE 115-*c* may perform the scheduled communication in accordance with (e.g., using) the quantity of antenna ports supported at the UE 115-*c* which were indicated via the fourth L1 report. By way of another example, the feedback message received at 460 in response to the fourth L1 report may indicate for the UE 115-*c* to adjust TCI states/TCI codepoints at the UE 115-*c*. In this example, the UE 115-*c* may be configured to perform subsequent communications in accordance with the indication of the TCI states/TCI codepoints received via the feedback message at 460.

At 465, the UE 115-*c* may receive, from one or more components of the network entity 105-*c*, a control message (e.g., DCI message, MAC-CE message) which deactivates L1 transmission occasions which were configured via the control signaling (e.g., RRC signaling) at 405. In particular, the control message at 465 may deactivate the second subset of transmission occasions which are dedicated for enhanced L1 reports. The UE 115-*c* may be configured to refrain from transmitting L1 reports using the second subset of transmission occasions following the deactivation at 465. In some cases, the network entity 105-*c* may deactivate transmission occasions dedicated for enhanced L1 reports autonomously, in response to a request from the UE 115-*c*, or both.

Techniques described herein may enable traditional/legacy L1 reports (e.g., L1 reports including beam information) to be communicated at a different periodicity or regularity as compared to new L1 reports including antenna panel information. In particular, techniques described herein may enable the UE 115-*c* to communicate beam information via L1 reports more frequently than antenna panel information. In this regard, techniques described herein may reduce a frequency at which the UE 115-*c* must report antenna panel information, thereby reducing signaling and power consumption at the UE 115-*c*, and leading to a more efficient use of resources within the wireless communications system. Moreover, due to the fact that the network entity 105-*c* may be expected to transmit HARQ feedback in response to antenna panel information, by reducing a frequency with which antenna panel information is communicated via L1 reports, techniques described herein may reduce HARQ signaling at the network entity 105-*c*, further reducing control signaling overhead, improving resource utilization, and decreasing power consumption within the wireless communications system.

Figure 5:
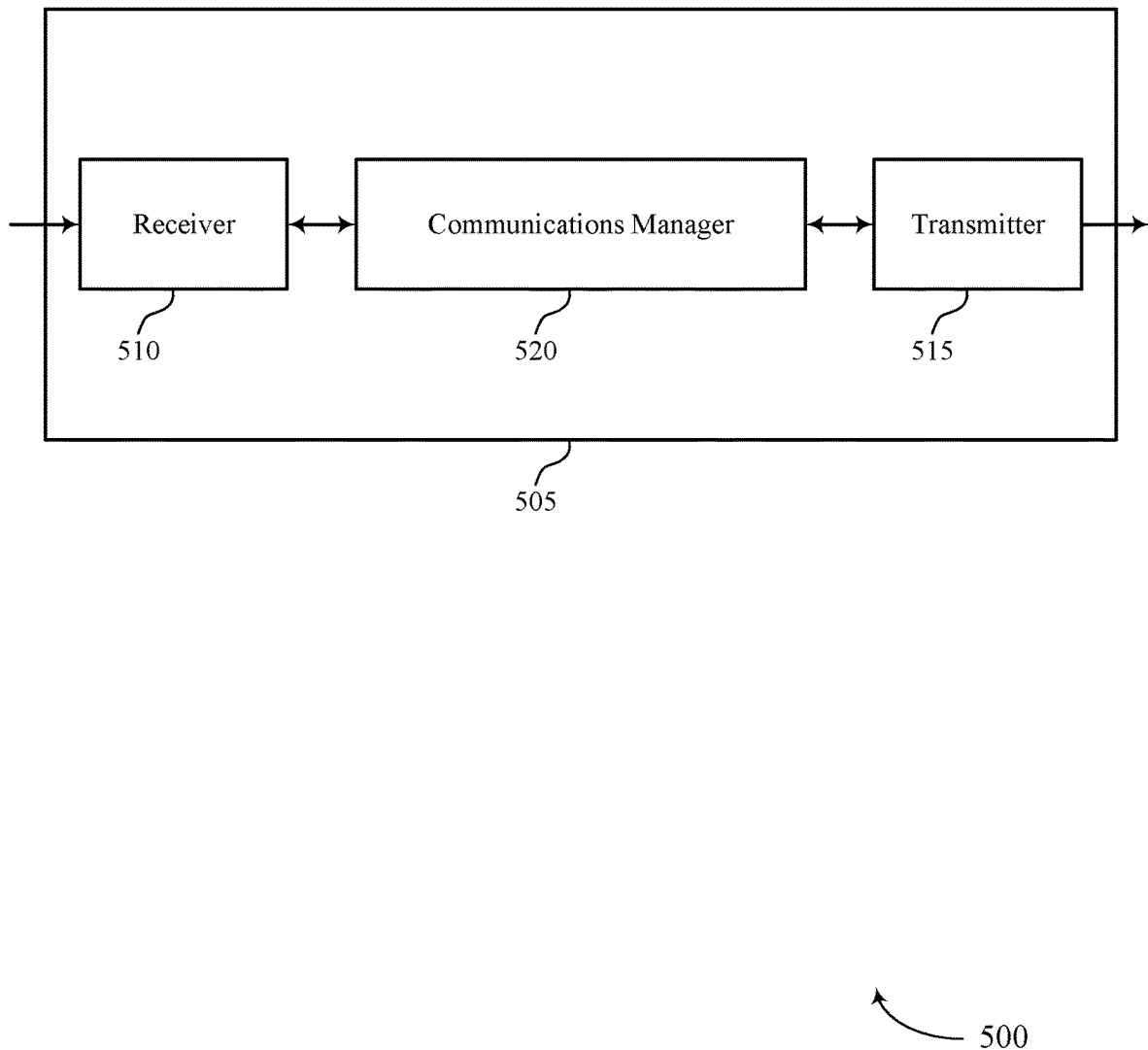
FIGS. 5 and 6 show block diagrams of devices that support techniques for indicating panel information reports via beam reporting occasions in accordance with aspects of the present disclosure.

FIG. 5 shows a block diagram 500 of a device 505 that supports techniques for indicating panel information reports via beam reporting occasions in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating panel information reports via beam reporting occasions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for indicating panel information reports via beam reporting occasions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for indicating panel information reports via beam reporting occasions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information. The communications manager 520 may be configured as or otherwise support a means for transmitting, within a first transmission occasion of the first subset of transmission occasions, a first L1 report including a first beam information report. The communications manager 520 may be configured as or otherwise support a means for transmitting, within a second transmission occasion of the second subset of transmission occasions, a second L1 report including a second beam information report and an indication of a quantity of antenna ports supported by the UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques which enable traditional/legacy L1 reports (e.g., L1 reports including beam information) to be communicated at a different periodicity or regularity as compared to new L1 reports including antenna panel information. In particular, techniques described herein may enable UEs 115 to communicate beam information via L1 reports more frequently than antenna panel information. In this regard, techniques described herein may reduce a frequency at which UEs 115 must report antenna panel information, thereby reducing signaling and power consumption at the UEs 115, and leading to a more efficient use of resources within the wireless communications system. Moreover, due to the fact that network entities 105 may be expected to transmit HARQ feedback in response to antenna panel information, by reducing a frequency with which antenna panel information is communicated via L1 reports, techniques described herein may reduce HARQ signaling at the network entity 105, further reducing control signaling overhead, improving resource utilization, and decreasing power consumption within the wireless communications system.

Figure 6:
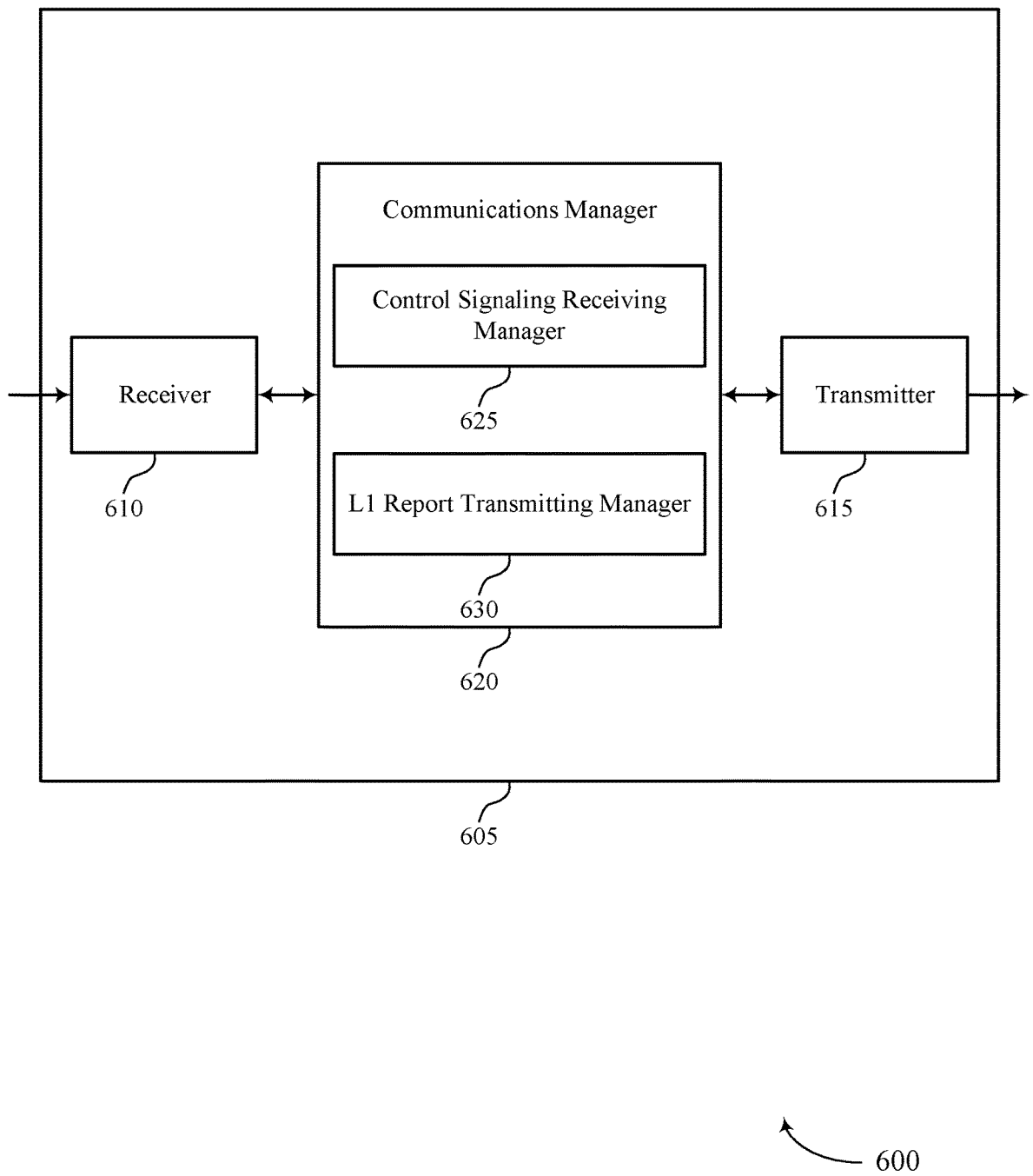

FIG. 6 shows a block diagram 600 of a device 605 that supports techniques for indicating panel information reports via beam reporting occasions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for indicating panel information reports via beam reporting occasions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for indicating panel information reports via beam reporting occasions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for indicating panel information reports via beam reporting occasions as described herein. For example, the communications manager 620 may include a control signaling receiving manager 625 a L1 report transmitting manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control signaling receiving manager 625 may be configured as or otherwise support a means for receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information. The L1 report transmitting manager 630 may be configured as or otherwise support a means for transmitting, within a first transmission occasion of the first subset of transmission occasions, a first L1 report including a first beam information report. The L1 report transmitting manager 630 may be configured as or otherwise support a means for transmitting, within a second transmission occasion of the second subset of transmission occasions, a second L1 report including a second beam information report and an indication of a quantity of antenna ports supported by the UE.

Figure 7:
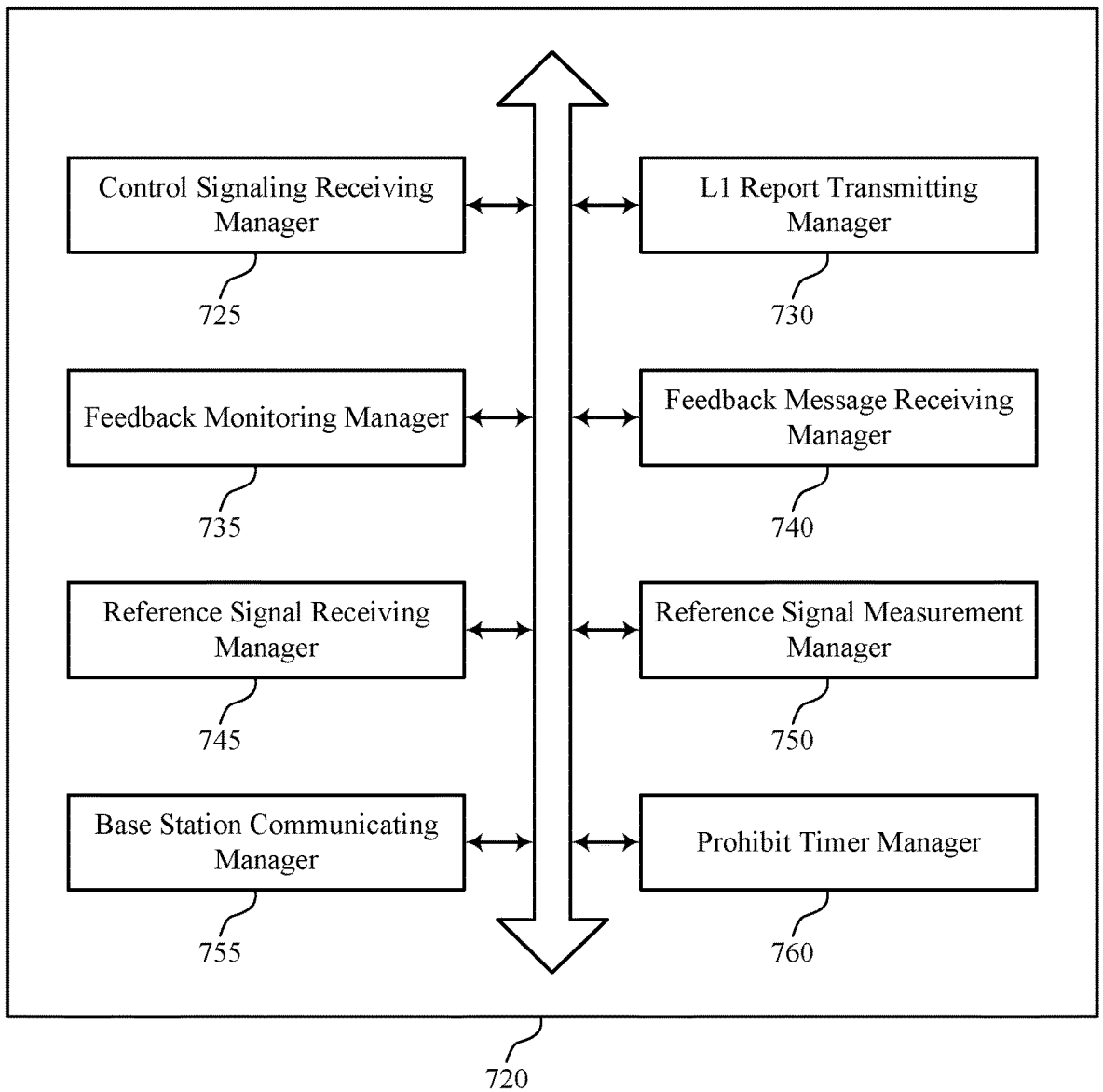
FIG. 7 shows a block diagram of a communications manager that supports techniques for indicating panel information reports via beam reporting occasions in accordance with aspects of the present disclosure.

FIG. 7 shows a block diagram 700 of a communications manager 720 that supports techniques for indicating panel information reports via beam reporting occasions in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for indicating panel information reports via beam reporting occasions as described herein. For example, the communications manager 720 may include a control signaling receiving manager 725, a L1 report transmitting manager 730, a feedback monitoring manager 735, a feedback message receiving manager 740, a reference signal receiving manager 745, a reference signal measurement manager 750, a network entity communicating manager 755, a prohibit timer manager 760, or any combination thereof. Each of these components may communicate, directly or indirectly, with one another (e.g., via one or more buses).

The communications manager 720 may support wireless communication at a UE in accordance with examples as disclosed herein. The control signaling receiving manager 725 may be configured as or otherwise support a means for receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information. The L1 report transmitting manager 730 may be configured as or otherwise support a means for transmitting, within a first transmission occasion of the first subset of transmission occasions, a first L1 report including a first beam information report. In some examples, the L1 report transmitting manager 730 may be configured as or otherwise support a means for transmitting, within a second transmission occasion of the second subset of transmission occasions, a second L1 report including a second beam information report and an indication of a quantity of antenna ports supported by the UE.

In some examples, the control signaling receiving manager 725 may be configured as or otherwise support a means for receiving, via the control signaling, an indication of a first periodicity associated with the first subset of transmission occasions and a second periodicity associated with the second subset of transmission occasions, where the first L1 report is transmitted in accordance with the first periodicity, and where the second L1 report is transmitted in accordance with the second periodicity.

In some examples, to support receiving the control signaling indicating the first and second periodicities, the control signaling receiving manager 725 may be configured as or otherwise support a means for receiving an RRC message associated with a reporting configuration, the RRC message indicating a set of multiple periodicities associated with the reporting configuration, where the set of multiple periodicities include at least the first periodicity and the second periodicity.

In some examples, to support receiving the control signaling indicating the first and second periodicities, the control signaling receiving manager 725 may be configured as or otherwise support a means for receiving a first RRC message associated with a first reporting configuration, the first RRC message indicating the first periodicity associated with the first reporting configuration. In some examples, to support receiving the control signaling indicating the first and second periodicities, the control signaling receiving manager 725 may be configured as or otherwise support a means for receiving a second RRC message associated with a second reporting configuration, the second RRC message indicating the second periodicity associated with the second reporting configuration. In some examples, the first periodicity is associated with a greater frequency as compared to the second periodicity.

In some examples, the L1 report transmitting manager 730 may be configured as or otherwise support a means for transmitting, within a third transmission occasion of the second subset of transmission occasions, a third L1 report including a third beam information report. In some examples, the L1 report transmitting manager 730 may be configured as or otherwise support a means for transmitting, via the third L1 report, an indication that the third L1 report does not include antenna port information.

In some examples, the prohibit timer manager 760 may be configured as or otherwise support a means for initiating a reporting prohibit timer based on transmitting the second L1 report. In some examples, the L1 report transmitting manager 730 may be configured as or otherwise support a means for transmitting the third L1 report without antenna port information based on the third transmission occasion being positioned prior to an expiration of the reporting prohibit timer in a time domain.

In some examples, the control signaling receiving manager 725 may be configured as or otherwise support a means for receiving, via the control signaling, an indication of the reporting prohibit timer, where initiating the reporting prohibit timer is based on receiving the control signaling.

In some examples, the L1 report transmitting manager 730 may be configured as or otherwise support a means for transmitting, within a fourth transmission occasion of the second subset of transmission occasions, a fourth L1 report including a fourth beam information report and an indication of the quantity of antenna ports supported by the UE, a second quantity of antenna ports supported by the UE, or both. In some examples, the L1 report transmitting manager 730 may be configured as or otherwise support a means for transmitting, via the fourth L1 report, an indication that the fourth L1 report includes antenna port information based on the fourth transmission occasion being positioned subsequent to the expiration of the reporting prohibit timer in the time domain.

In some examples, the L1 report transmitting manager 730 may be configured as or otherwise support a means for refraining from transmitting a third L1 report within a third transmission occasion of the second subset of transmission occasions.

In some examples, the feedback monitoring manager 735 may be configured as or otherwise support a means for monitoring for feedback messages based on transmitting the second L1 report. In some examples, the feedback message receiving manager 740 may be configured as or otherwise support a means for receiving a feedback message responsive to the second L1 report based on the monitoring.

In some examples, the control signaling receiving manager 725 may be configured as or otherwise support a means for receiving a control message indicating an activation of the second subset of transmission occasions, where transmitting the second L1 report is based on the activation. In some examples, the control signaling receiving manager 725 may be configured as or otherwise support a means for receiving a second control message indicating a deactivation of the second subset of transmission occasions. In some examples, the L1 report transmitting manager 730 may be configured as or otherwise support a means for refraining from transmitting a third L1 report via the second subset of transmission occasions based on the deactivation. In some examples, the control signaling includes an RRC message. In some examples, the control message includes a DCI message, a MAC-CE message, or both.

In some examples, to support receiving the control signaling, the control signaling receiving manager 725 may be configured as or otherwise support a means for receiving an RRC message indicating the first subset of transmission occasions. In some examples, to support receiving the control signaling, the control signaling receiving manager 725 may be configured as or otherwise support a means for receiving a DCI message scheduling the second L1 report within the first subset of transmission occasions.

In some examples, the control signaling receiving manager 725 may be configured as or otherwise support a means for receiving a control message in response to the second L1 report, the control message including an acknowledgment of the second L1 report and indicating one or more updated TCI states associated with the second beam information report, the quantity of antenna ports, or both. In some examples, the control signaling receiving manager 725 may be configured as or otherwise support a means for receiving a control message in response to the second L1 report, the control message indicating a TCI codepoint associated with an acknowledgment of the second L1 report.

In some examples, the feedback message receiving manager 740 may be configured as or otherwise support a means for receiving a feedback message in response to the second L1 report.

In some examples, the feedback message includes a NACK message, and the L1 report transmitting manager 730 may be configured as or otherwise support a means for transmitting, in response to the NACK message and within a third transmission occasion of the second subset of transmission occasions, a third L1 report including the second beam information report and an indication of the quantity of antenna ports supported by the UE.

In some examples, the control signaling receiving manager 725 may be configured as or otherwise support a means for receiving, via the control signaling, additional control signaling, or both, an indication of a set of resources associated with a set of multiple reference signals. In some examples, the reference signal receiving manager 745 may be configured as or otherwise support a means for receiving the set of multiple reference signals within the set of resources. In some examples, the reference signal measurement manager 750 may be configured as or otherwise support a means for performing measurements on the set of multiple reference signals, where the first beam information report, the second beam information report, or both, are based on the measurements.

In some examples, the control signaling receiving manager 725 may be configured as or otherwise support a means for receiving, from a network entity and based on the second L1 report, a control message scheduling a communication between the UE and the network entity. In some examples, the network entity communicating manager 755 may be configured as or otherwise support a means for performing the communication with the network entity in accordance with the quantity of antenna ports supported by the UE. In some examples, the second subset of transmission occasions are included within the first subset of transmission occasions.

Figure 8:
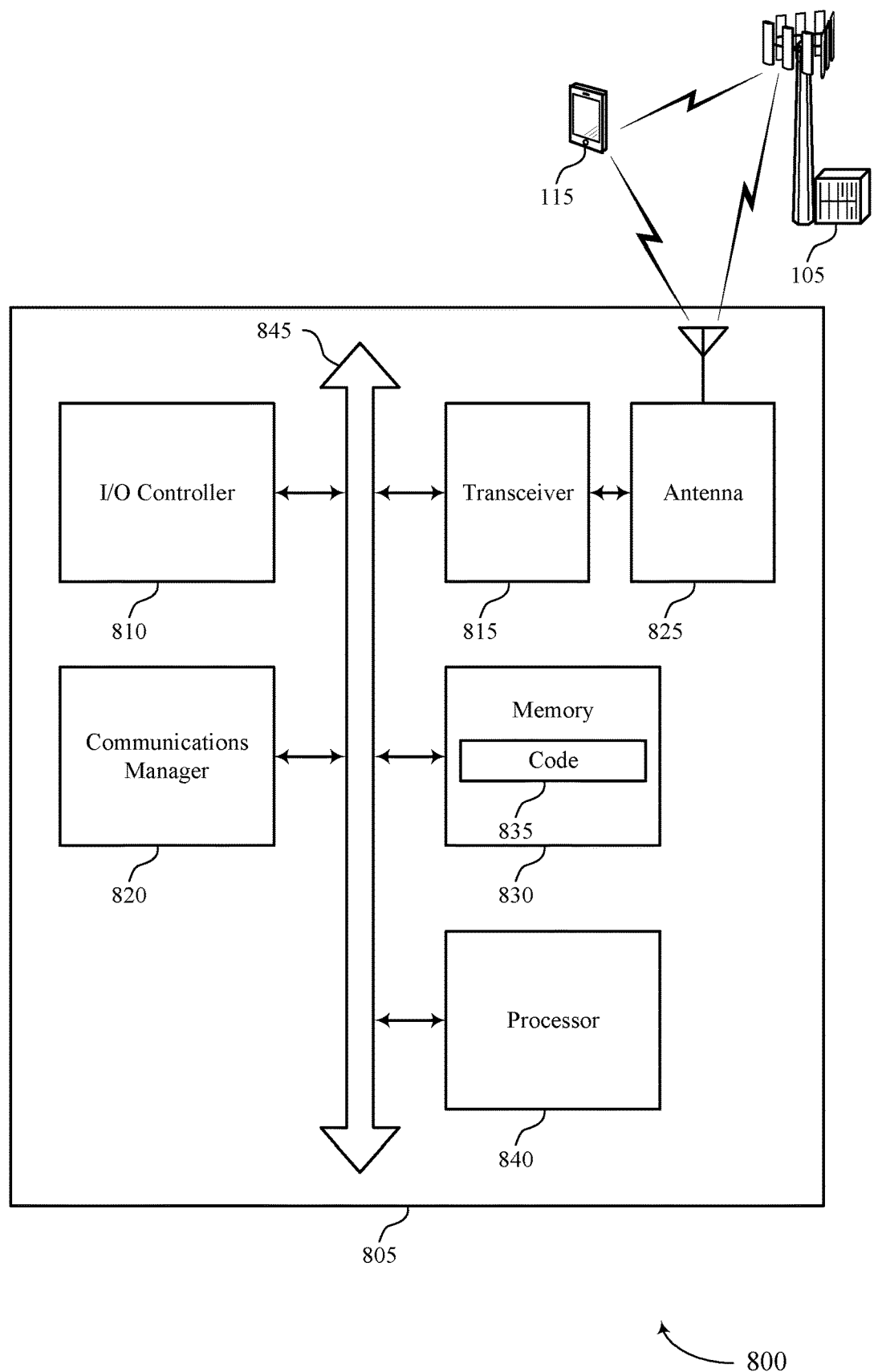
FIG. 8 shows a diagram of a system including a device that supports techniques for indicating panel information reports via beam reporting occasions in accordance with aspects of the present disclosure.

FIG. 8 shows a diagram of a system 800 including a device 805 that supports techniques for indicating panel information reports via beam reporting occasions in accordance with aspects of the present disclosure. The device 805 may be an example of or include the components of a device 505, a device 605, or a UE 115 as described herein. The device 805 may communicate wirelessly with one or more network entities 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for indicating panel information reports via beam reporting occasions). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information. The communications manager 820 may be configured as or otherwise support a means for transmitting, within a first transmission occasion of the first subset of transmission occasions, a first L1 report including a first beam information report. The communications manager 820 may be configured as or otherwise support a means for transmitting, within a second transmission occasion of the second subset of transmission occasions, a second L1 report including a second beam information report and an indication of a quantity of antenna ports supported by the UE.

By including or configuring the communications manager 820 in accordance with examples as described herein, the device 805 may support techniques which enable traditional/legacy L1 reports (e.g., L1 reports including beam information) to be communicated at a different periodicity or regularity as compared to new L1 reports including antenna panel information. In particular, techniques described herein may enable UEs 115 to communicate beam information via L1 reports more frequently than antenna panel information. In this regard, techniques described herein may reduce a frequency at which UEs 115 must report antenna panel information, thereby reducing signaling and power consumption at the UEs 115, and leading to a more efficient use of resources within the wireless communications system. Moreover, due to the fact that network entities 105 may be expected to transmit HARQ feedback in response to antenna panel information, by reducing a frequency with which antenna panel information is communicated via L1 reports, techniques described herein may reduce HARQ signaling at the network entity 105, further reducing control signaling overhead, improving resource utilization, and decreasing power consumption within the wireless communications system.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for indicating panel information reports via beam reporting occasions as described herein, or the processor 840 and the memory 830 may be otherwise configured to perform or support such operations.

Figure 9:
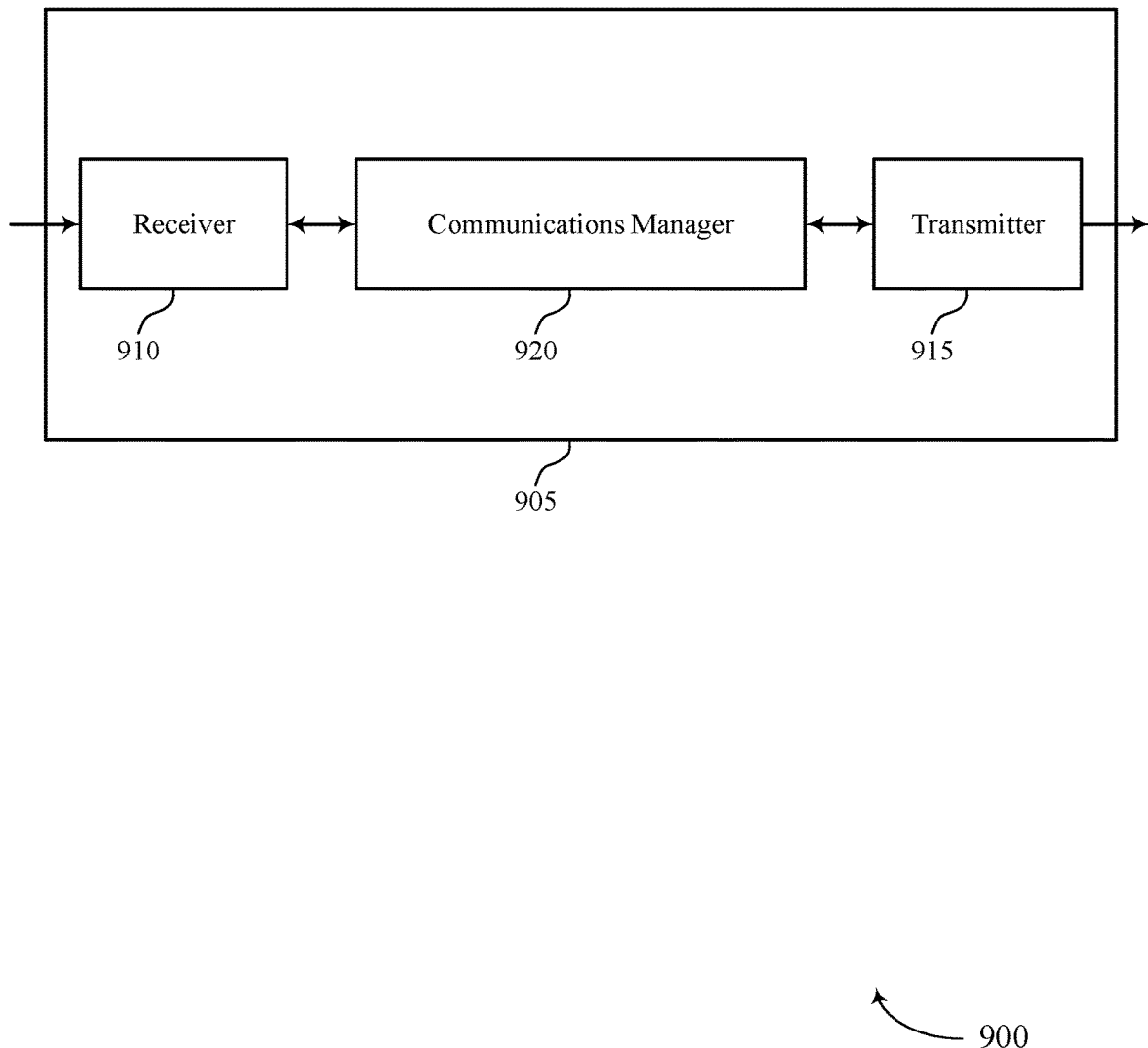
FIGS. 9 and 10 show block diagrams of devices that support techniques for indicating panel information reports via beam reporting occasions in accordance with aspects of the present disclosure.

FIG. 9 shows a block diagram 900 of a device 905 that supports techniques for indicating panel information reports via beam reporting occasions in accordance with aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating panel information reports via beam reporting occasions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating panel information reports via beam reporting occasions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for indicating panel information reports via beam reporting occasions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network entity in accordance with examples as disclosed herein. For example, the communications manager 920 may be configured as or otherwise support a means for transmitting control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information. The communications manager 920 may be configured as or otherwise support a means for receiving, within a first transmission occasion of the first subset of transmission occasions, a first L1 report including a first beam information report. The communications manager 920 may be configured as or otherwise support a means for receiving, within a second transmission occasion of the second subset of transmission occasions, a second L1 report including a second beam information report and an indication of a quantity of antenna ports supported by the UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques which enable traditional/legacy L1 reports (e.g., L1 reports including beam information) to be communicated at a different periodicity or regularity as compared to new L1 reports including antenna panel information. In particular, techniques described herein may enable UEs 115 to communicate beam information via L1 reports more frequently than antenna panel information. In this regard, techniques described herein may reduce a frequency at which UEs 115 must report antenna panel information, thereby reducing signaling and power consumption at the UEs 115, and leading to a more efficient use of resources within the wireless communications system. Moreover, due to the fact that network entities 105 may be expected to transmit HARQ feedback in response to antenna panel information, by reducing a frequency with which antenna panel information is communicated via L1 reports, techniques described herein may reduce HARQ signaling at the network entity 105, further reducing control signaling overhead, improving resource utilization, and decreasing power consumption within the wireless communications system.

Figure 10:
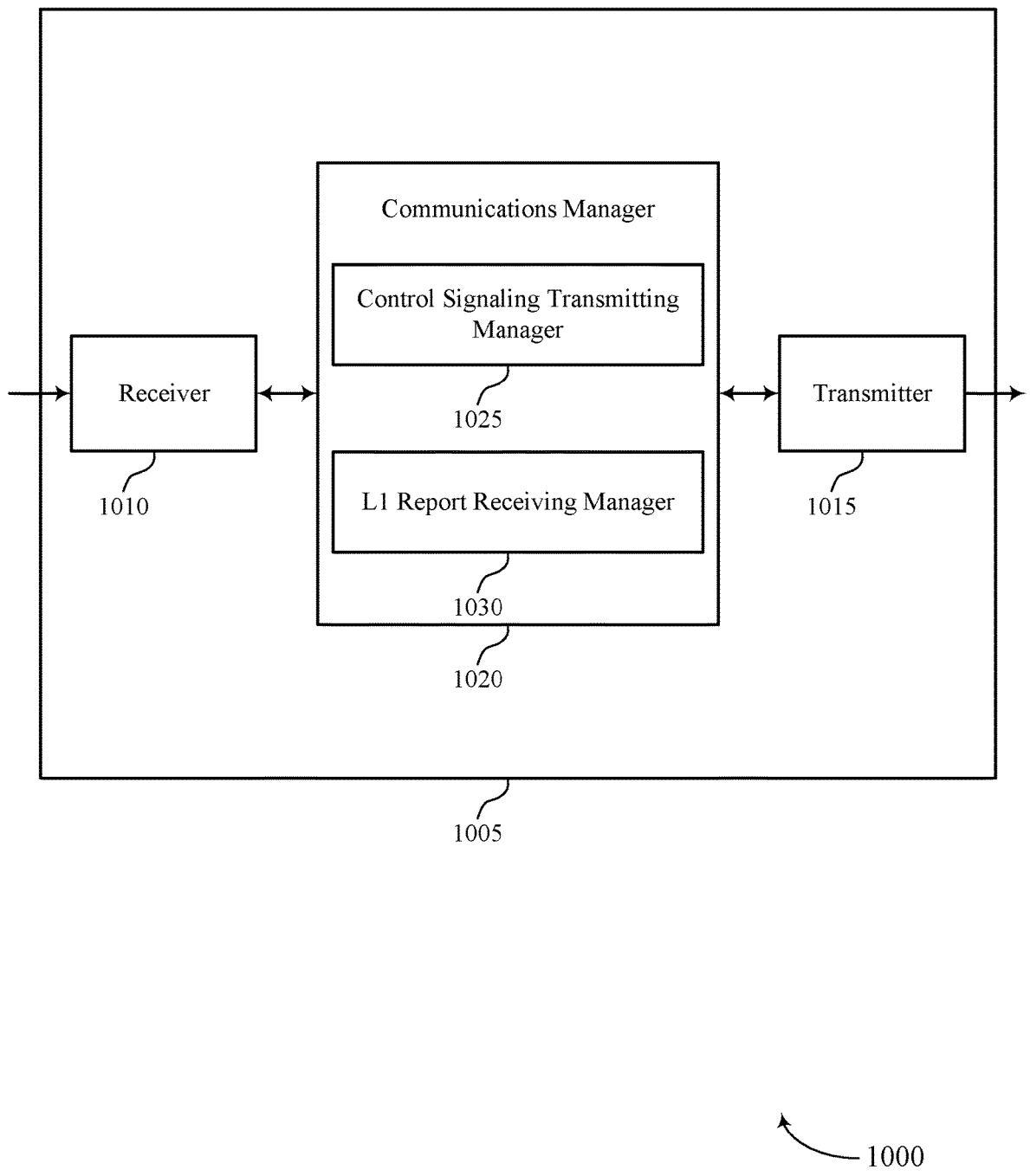

FIG. 10 shows a block diagram 1000 of a device 1005 that supports techniques for indicating panel information reports via beam reporting occasions in accordance with aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for indicating panel information reports via beam reporting occasions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for indicating panel information reports via beam reporting occasions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for indicating panel information reports via beam reporting occasions as described herein. For example, the communications manager 1020 may include a control signaling transmitting manager 1025 a L1 report receiving manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. The control signaling transmitting manager 1025 may be configured as or otherwise support a means for transmitting control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information. The L1 report receiving manager 1030 may be configured as or otherwise support a means for receiving, within a first transmission occasion of the first subset of transmission occasions, a first L1 report including a first beam information report. The L1 report receiving manager 1030 may be configured as or otherwise support a means for receiving, within a second transmission occasion of the second subset of transmission occasions, a second L1 report including a second beam information report and an indication of a quantity of antenna ports supported by the UE.

Figure 11:
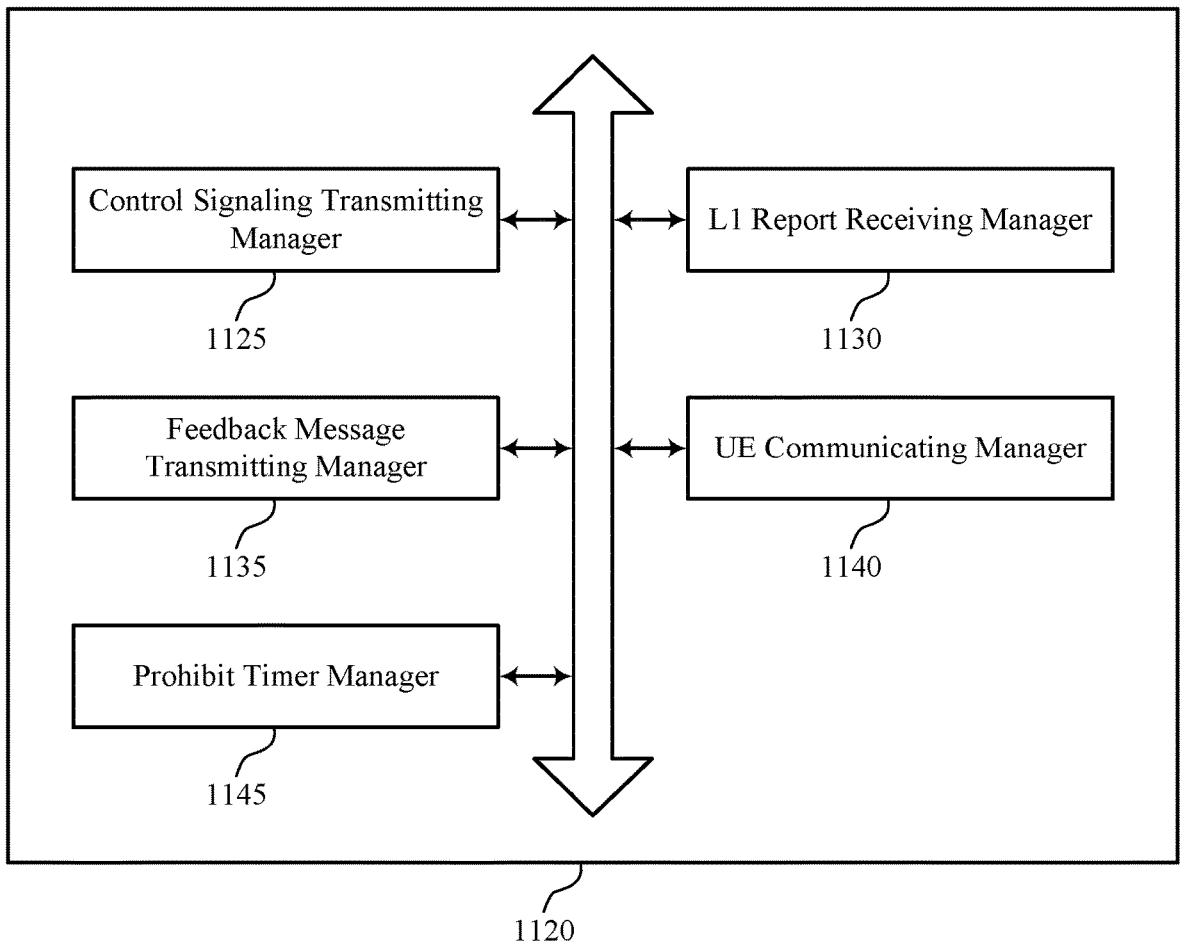
FIG. 11 shows a block diagram of a communications manager that supports techniques for indicating panel information reports via beam reporting occasions in accordance with aspects of the present disclosure.

FIG. 11 shows a block diagram 1100 of a communications manager 1120 that supports techniques for indicating panel information reports via beam reporting occasions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for indicating panel information reports via beam reporting occasions as described herein. For example, the communications manager 1120 may include a control signaling transmitting manager 1125, a L1 report receiving manager 1130, a feedback message transmitting manager 1135, a UE communicating manager 1140, a prohibit timer manager 1145, or any combination thereof. Each of these components may communicate, directly or indirectly, with one another (e.g., via one or more buses).

The communications manager 1120 may support wireless communication at a network entity in accordance with examples as disclosed herein. The control signaling transmitting manager 1125 may be configured as or otherwise support a means for transmitting control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information. The L1 report receiving manager 1130 may be configured as or otherwise support a means for receiving, within a first transmission occasion of the first subset of transmission occasions, a first L1 report including a first beam information report. In some examples, the L1 report receiving manager 1130 may be configured as or otherwise support a means for receiving, within a second transmission occasion of the second subset of transmission occasions, a second L1 report including a second beam information report and an indication of a quantity of antenna ports supported by the UE.

In some examples, the control signaling transmitting manager 1125 may be configured as or otherwise support a means for transmitting, via the control signaling, an indication of a first periodicity associated with the first subset of transmission occasions and a second periodicity associated with the second subset of transmission occasions, where the first L1 report is received in accordance with the first periodicity, and where the second L1 report is received in accordance with the second periodicity.

In some examples, to support receiving the control signaling indicating the first and second periodicities, the control signaling transmitting manager 1125 may be configured as or otherwise support a means for transmitting an RRC message associated with a reporting configuration, the RRC message indicating a set of multiple periodicities associated with the reporting configuration, where the set of multiple periodicities include at least the first periodicity and the second periodicity.

In some examples, to support transmitting the control signaling indicating the first and second periodicities, the control signaling transmitting manager 1125 may be configured as or otherwise support a means for transmitting a first RRC message associated with a first reporting configuration, the first RRC message indicating the first periodicity associated with the first reporting configuration. In some examples, to support transmitting the control signaling indicating the first and second periodicities, the control signaling transmitting manager 1125 may be configured as or otherwise support a means for transmitting a second RRC message associated with a second reporting configuration, the second RRC message indicating the second periodicity associated with the second reporting configuration. In some examples, the first periodicity is associated with a greater frequency as compared to the second periodicity.

In some examples, the L1 report receiving manager 1130 may be configured as or otherwise support a means for receiving, within a third transmission occasion of the second subset of transmission occasions, a third L1 report including a third beam information report. In some examples, the L1 report receiving manager 1130 may be configured as or otherwise support a means for receiving, via the third L1 report, an indication that the third L1 report does not include antenna port information.

In some examples, the prohibit timer manager 1145 may be configured as or otherwise support a means for initiating a reporting prohibit timer based on receiving the second L1 report. In some examples, the L1 report receiving manager 1130 may be configured as or otherwise support a means for receiving the third L1 report without antenna port information based on the third transmission occasion being positioned prior to an expiration of the reporting prohibit timer in a time domain.

In some examples, the control signaling transmitting manager 1125 may be configured as or otherwise support a means for transmitting, via the control signaling, an indication of the reporting prohibit timer, where initiating the reporting prohibit timer is based on transmitting the control signaling.

In some examples, the L1 report receiving manager 1130 may be configured as or otherwise support a means for receiving, within a fourth transmission occasion of the second subset of transmission occasions, a fourth L1 report including a fourth beam information report and an indication of the quantity of antenna ports supported by the UE, a second quantity of antenna ports supported by the UE, or both. In some examples, the L1 report receiving manager 1130 may be configured as or otherwise support a means for receiving, via the fourth L1 report, an indication that the fourth L1 report includes antenna port information based on the fourth transmission occasion being positioned subsequent to the expiration of the reporting prohibit timer in the time domain.

In some examples, the control signaling transmitting manager 1125 may be configured as or otherwise support a means for transmitting a control message indicating an activation of the second subset of transmission occasions, where receiving the second L1 report is based on the activation. In some examples, the control signaling includes an RRC message. In some examples, the control message includes a DCI message, a MAC-CE message, or both.

In some examples, to support receiving the control signaling, the control signaling transmitting manager 1125 may be configured as or otherwise support a means for transmitting an RRC message indicating the first subset of transmission occasions. In some examples, to support receiving the control signaling, the control signaling transmitting manager 1125 may be configured as or otherwise support a means for transmitting a DCI message scheduling the second L1 report within the first subset of transmission occasions.

In some examples, the control signaling transmitting manager 1125 may be configured as or otherwise support a means for transmitting a control message in response to the second L1 report, the control message including an acknowledgment of the second L1 report and indicating one or more updated TCI states associated with the second beam information report, the quantity of antenna ports, or both. In some examples, the control signaling transmitting manager 1125 may be configured as or otherwise support a means for transmitting a control message in response to the second L1 report, the control message indicating a TCI codepoint associated with an acknowledgment of the second L1 report.

In some examples, the feedback message transmitting manager 1135 may be configured as or otherwise support a means for transmitting a feedback message in response to the second L1 report.

In some examples, the feedback message includes a NACK message, and the L1 report receiving manager 1130 may be configured as or otherwise support a means for receiving, in response to the NACK message and within a third transmission occasion of the second subset of transmission occasions, a third L1 report including the second beam information report and an indication of the quantity of antenna ports supported by the UE.

In some examples, the control signaling transmitting manager 1125 may be configured as or otherwise support a means for transmitting, to the UE and based on the second L1 report, a control message scheduling a communication between the UE and the network entity. In some examples, the UE communicating manager 1140 may be configured as or otherwise support a means for performing the communication with the UE in accordance with the quantity of antenna ports supported by the UE. In some examples, the second subset of transmission occasions are included within the first subset of transmission occasions.

Figure 12:
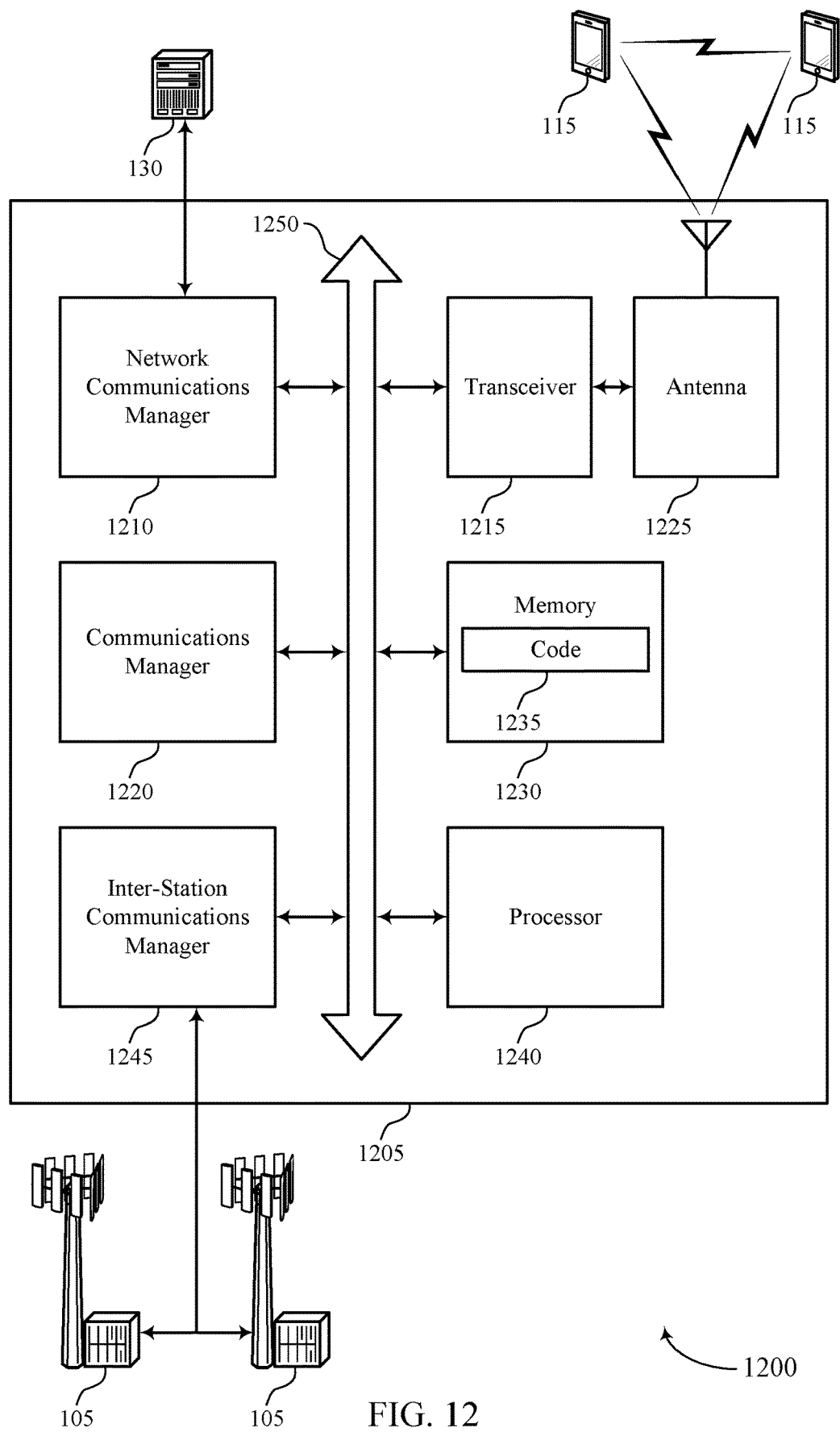
FIG. 12 shows a diagram of a system including a device that supports techniques for indicating panel information reports via beam reporting occasions in accordance with aspects of the present disclosure.

FIG. 12 shows a diagram of a system 1200 including a device 1205 that supports techniques for indicating panel information reports via beam reporting occasions in accordance with aspects of the present disclosure. The device 1205 may be an example of or include the components of a device 905, a device 1005, or a network entity 105 as described herein. The device 1205 may communicate wirelessly with one or more network entities 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for indicating panel information reports via beam reporting occasions). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other network entities 105, and may include a controller or scheduler for controlling communications with UEs 115 in cooperation with other network entities 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information. The communications manager 1220 may be configured as or otherwise support a means for receiving, within a first transmission occasion of the first subset of transmission occasions, a first L1 report including a first beam information report. The communications manager 1220 may be configured as or otherwise support a means for receiving, within a second transmission occasion of the second subset of transmission occasions, a second L1 report including a second beam information report and an indication of a quantity of antenna ports supported by the UE.

By including or configuring the communications manager 1220 in accordance with examples as described herein, the device 1205 may support techniques which enable traditional/legacy L1 reports (e.g., L1 reports including beam information) to be communicated at a different periodicity or regularity as compared to new L1 reports including antenna panel information. In particular, techniques described herein may enable UEs 115 to communicate beam information via L1 reports more frequently than antenna panel information. In this regard, techniques described herein may reduce a frequency at which UEs 115 must report antenna panel information, thereby reducing signaling and power consumption at the UEs 115, and leading to a more efficient use of resources within the wireless communications system. Moreover, due to the fact that network entities 105 may be expected to transmit HARQ feedback in response to antenna panel information, by reducing a frequency with which antenna panel information is communicated via L1 reports, techniques described herein may reduce HARQ signaling at the network entity 105, further reducing control signaling overhead, improving resource utilization, and decreasing power consumption within the wireless communications system.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for indicating panel information reports via beam reporting occasions as described herein, or the processor 1240 and the memory 1230 may be otherwise configured to perform or support such operations.

Figure 13:
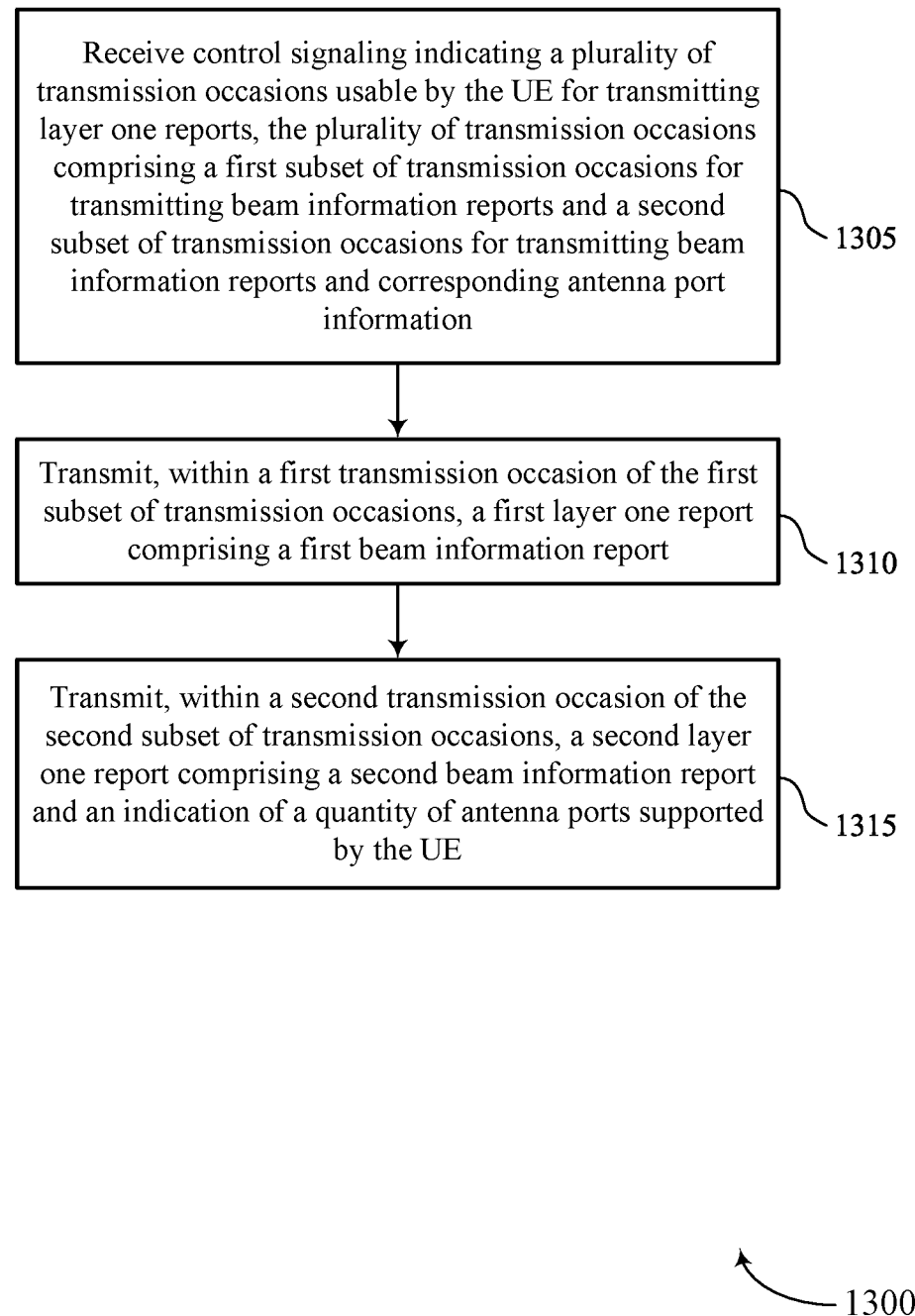
FIGS. 13 through 16 show flowcharts illustrating methods that support techniques for indicating panel information reports via beam reporting occasions in accordance with aspects of the present disclosure.

FIG. 13 shows a flowchart illustrating a method 1300 that supports techniques for indicating panel information reports via beam reporting occasions in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information. The operations of 1305 may be performed in accordance with examples as disclosed herein. In some examples, aspects of the operations of 1305 may be performed by a control signaling receiving manager 725 as described with reference to FIG. 7.

At 1310, the method may include transmitting, within a first transmission occasion of the first subset of transmission occasions, a first L1 report including a first beam information report. The operations of 1310 may be performed in accordance with examples as disclosed herein. In some examples, aspects of the operations of 1310 may be performed by a L1 report transmitting manager 730 as described with reference to FIG. 7.

At 1315, the method may include transmitting, within a second transmission occasion of the second subset of transmission occasions, a second L1 report including a second beam information report and an indication of a quantity of antenna ports supported by the UE. The operations of 1315 may be performed in accordance with examples as disclosed herein. In some examples, aspects of the operations of 1315 may be performed by a L1 report transmitting manager 730 as described with reference to FIG. 7.

Figure 14:
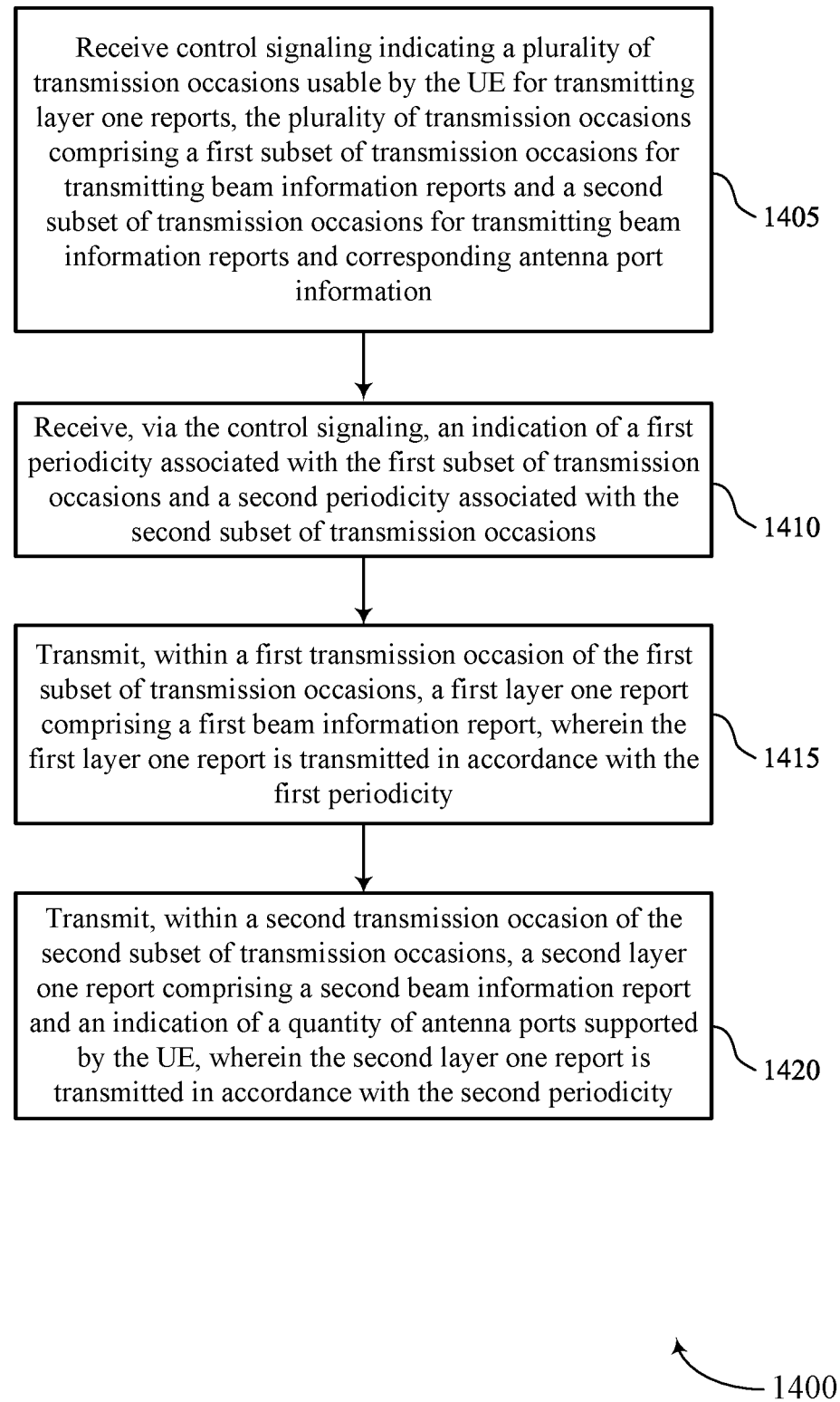

FIG. 14 shows a flowchart illustrating a method 1400 that supports techniques for indicating panel information reports via beam reporting occasions in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information. The operations of 1405 may be performed in accordance with examples as disclosed herein. In some examples, aspects of the operations of 1405 may be performed by a control signaling receiving manager 725 as described with reference to FIG. 7.

At 1410, the method may include receiving, via the control signaling, an indication of a first periodicity associated with the first subset of transmission occasions and a second periodicity associated with the second subset of transmission occasions. The operations of 1410 may be performed in accordance with examples as disclosed herein. In some examples, aspects of the operations of 1410 may be performed by a control signaling receiving manager 725 as described with reference to FIG. 7.

At 1415, the method may include transmitting, within a first transmission occasion of the first subset of transmission occasions, a first L1 report including a first beam information report, where the first L1 report is transmitted in accordance with the first periodicity. The operations of 1415 may be performed in accordance with examples as disclosed herein. In some examples, aspects of the operations of 1415 may be performed by a L1 report transmitting manager 730 as described with reference to FIG. 7.

At 1420, the method may include transmitting, within a second transmission occasion of the second subset of transmission occasions, a second L1 report including a second beam information report and an indication of a quantity of antenna ports supported by the UE, where the second L1 report is transmitted in accordance with the second periodicity. The operations of 1420 may be performed in accordance with examples as disclosed herein. In some examples, aspects of the operations of 1420 may be performed by a L1 report transmitting manager 730 as described with reference to FIG. 7.

Figure 15:
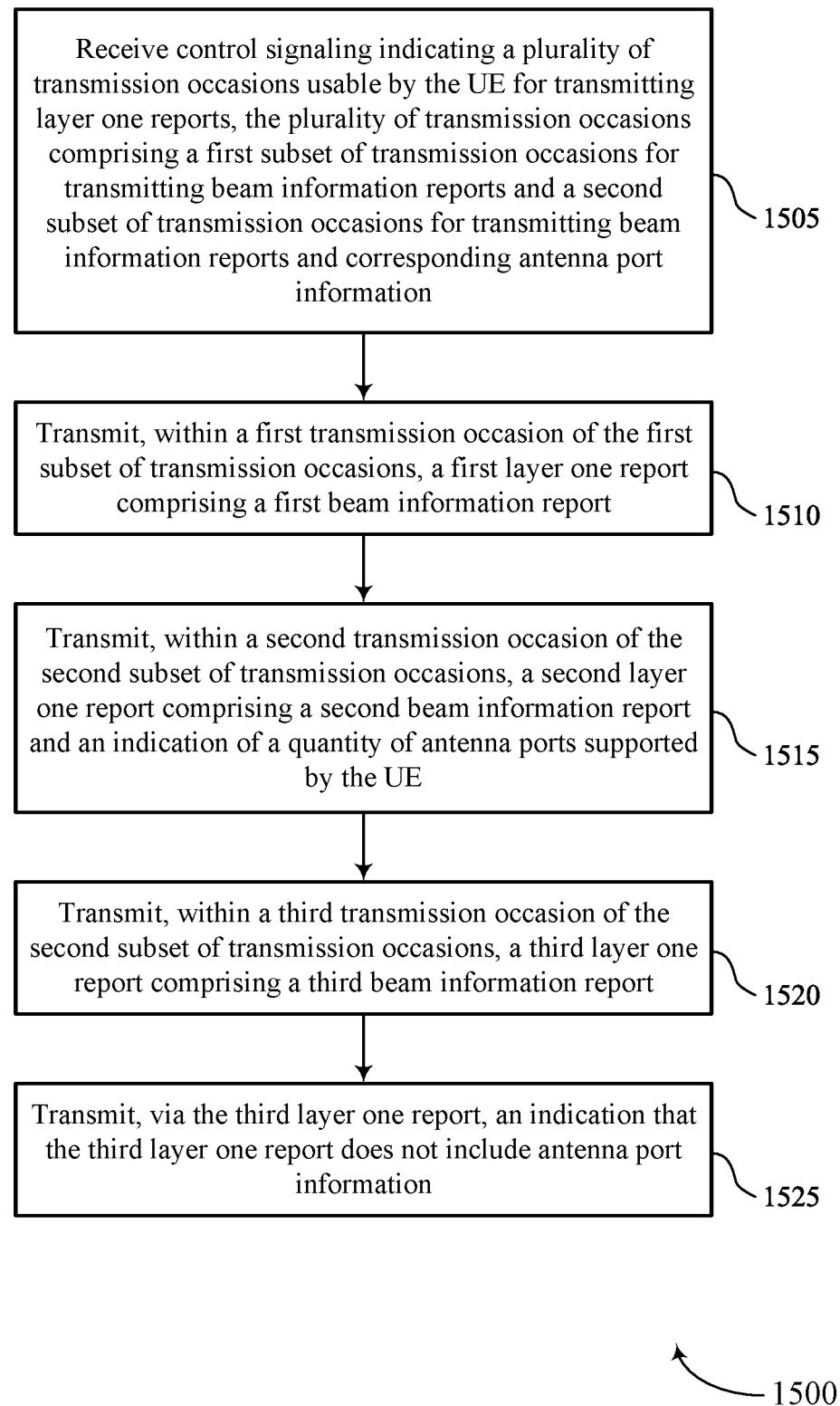

FIG. 15 shows a flowchart illustrating a method 1500 that supports techniques for indicating panel information reports via beam reporting occasions in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a set of multiple transmission occasions usable by the UE for transmitting L1 reports, the set of multiple transmission occasions including a first subset of transmission occasions for transmitting beam information reports and a second subset of transmission occasions for transmitting beam information reports and corresponding antenna port information. The operations of 1505 may be performed in accordance with examples as disclosed herein. In some examples, aspects of the operations of 1505 may be performed by a control signaling receiving manager 725 as described with reference to FIG. 7.

At 1510, the method may include transmitting, within a first transmission occasion of the first subset of transmission occasions, a first L1 report including a first beam information report. The operations of 1510 may be performed in accordance with examples as disclosed herein. In some examples, aspects of the operations of 1510 may be performed by a L1 report transmitting manager 730 as described with reference to FIG. 7.

At 1515, the method may include transmitting, within a second transmission occasion of the second subset of transmission occasions, a second L1 report including a second beam information report and an indication of a quantity of antenna ports supported by the UE. The operations of 1515 may be performed in accordance with examples as disclosed herein. In some examples, aspects of the operations of 1515 may be performed by a L1 report transmitting manager 730 as described with reference to FIG. 7.

At 1520, the method may include transmitting, within a third transmission occasion of the second subset of transmission occasions, a third L1 report including a third beam information report. The operations of 1520 may be performed in accordance with examples as disclosed herein. In some examples, aspects of the operations of 1520 may be performed by a L1 report transmitting manager 730 as described with reference to FIG. 7.

At 1525, the method may include transmitting, via the third L1 report, an indication that the third L1 report does not include antenna port information. The operations of 1525 may be performed in accordance with examples as disclosed herein. In some examples, aspects of the operations of 1525 may be performed by a L1 report transmitting manager 730 as described with reference to FIG. 7.

Figure 16:
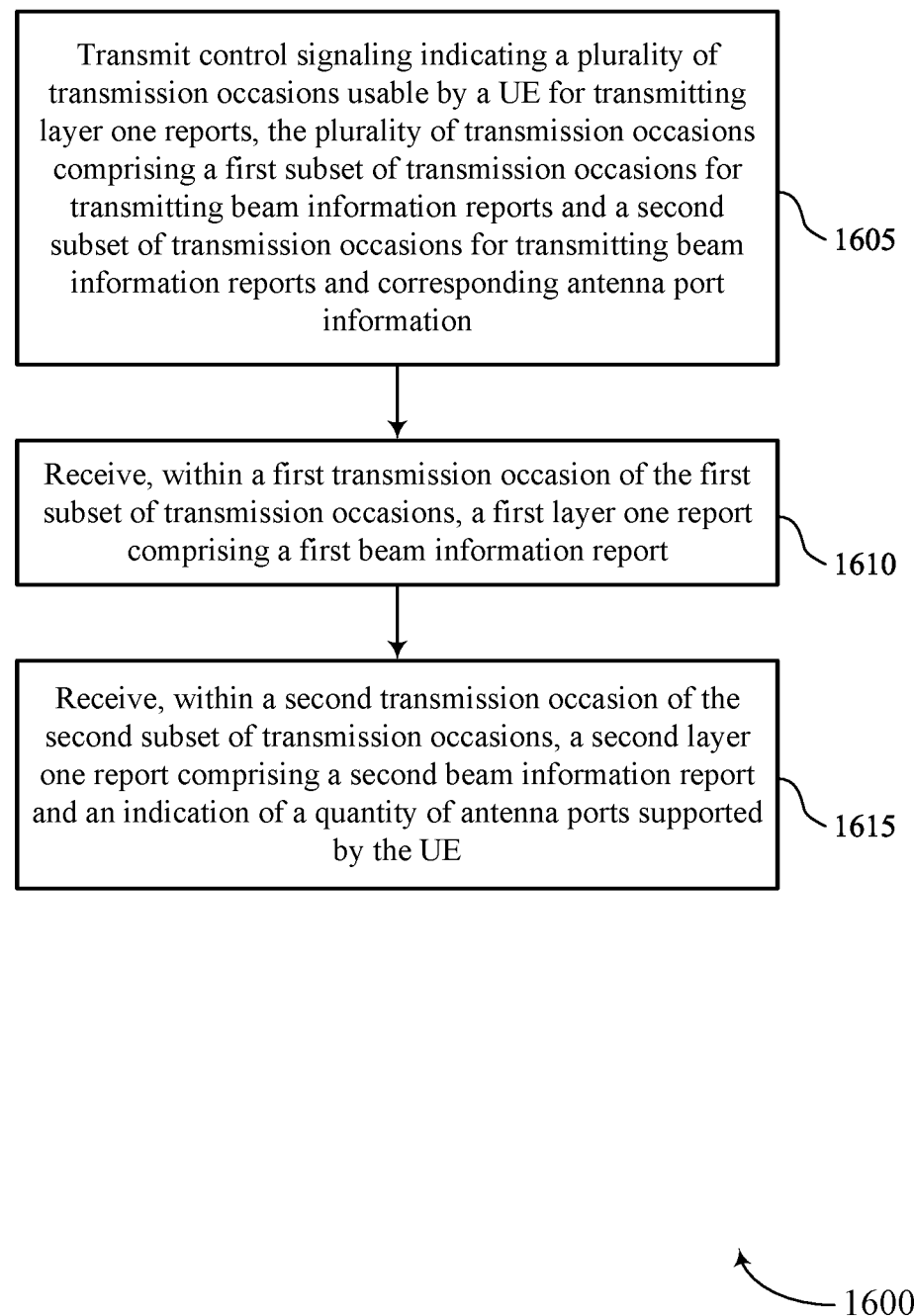

FIG. 16 shows a flowchart illustrating a method 1600 that supports techniques for indicating panel information reports via beam reporting occasions in accordance with aspects of the present disclosure. The operations of the method 1600 may be implemented by a network entity or its components as described herein. For example, the operations of the method 1600 may be performed by a network entity 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1605, the method may include transmitting control signaling indicating a set of multiple transmission occasions usable by a UE for transmitting L1 reports, the set of multiple transmission occasions including a first subset of transmission occasions for transmitting beam information reports and a second subset of transmission occasions for transmitting beam information reports and corresponding antenna port information. The operations of 1605 may be performed in accordance with examples as disclosed herein. In some examples, aspects of the operations of 1605 may be performed by a control signaling transmitting manager 1125 as described with reference to FIG. 11.

At 1610, the method may include receiving, within a first transmission occasion of the first subset of transmission occasions, a first L1 report including a first beam information report. The operations of 1610 may be performed in accordance with examples as disclosed herein. In some examples, aspects of the operations of 1610 may be performed by a L1 report receiving manager 1130 as described with reference to FIG. 11.

At 1615, the method may include receiving, within a second transmission occasion of the second subset of transmission occasions, a second L1 report including a second beam information report and an indication of a quantity of antenna ports supported by the UE. The operations of 1615 may be performed in accordance with examples as disclosed herein. In some examples, aspects of the operations of 1615 may be performed by a L1 report receiving manager 1130 as described with reference to FIG. 11.

The following provides an overview of aspects of the present disclosure:

Aspect 1: A method for wireless communication at a UE, comprising: receiving control signaling indicating a plurality of transmission occasions usable by the UE for transmitting L1 reports, the plurality of transmission occasions comprising a first subset of transmission occasions for transmitting beam information reports and a second subset of transmission occasions for transmitting beam information reports and corresponding antenna port information; transmitting, within a first transmission occasion of the first subset of transmission occasions, a first L1 report comprising a first beam information report; and transmitting, within a second transmission occasion of the second subset of transmission occasions, a second L1 report comprising a second beam information report and an indication of a quantity of antenna ports supported by the UE.

Aspect 2: The method of aspect 1, further comprising: receiving, via the control signaling, an indication of a first periodicity associated with the first subset of transmission occasions and a second periodicity associated with the second subset of transmission occasions, wherein the first L1 report is transmitted in accordance with the first periodicity, and wherein the second L1 report is transmitted in accordance with the second periodicity.

Aspect 3: The method of aspect 2, wherein receiving the control signaling indicating the first and second periodicities comprises: receiving an RRC message associated with a reporting configuration, the RRC message indicating a plurality of periodicities associated with the reporting configuration, wherein the plurality of periodicities comprise at least the first periodicity and the second periodicity.

Aspect 4: The method of any of aspects 2 through 3, wherein receiving the control signaling indicating the first and second periodicities comprises: receiving a first RRC message associated with a first reporting configuration, the first RRC message indicating the first periodicity associated with the first reporting configuration; and receiving a second RRC message associated with a second reporting configuration, the second RRC message indicating the second periodicity associated with the second reporting configuration.

Aspect 5: The method of any of aspects 2 through 4, wherein the first periodicity is associated with a greater frequency as compared to the second periodicity.

Aspect 6: The method of any of aspects 1 through 5, further comprising: transmitting, within a third transmission occasion of the second subset of transmission occasions, a third L1 report comprising a third beam information report; and transmitting, via the third L1 report, an indication that the third L1 report does not include antenna port information.

Aspect 7: The method of aspect 6, further comprising: initiating a reporting prohibit timer based at least in part on transmitting the second L1 report; and transmitting the third L1 report without antenna port information based at least in part on the third transmission occasion being positioned prior to an expiration of the reporting prohibit timer in a time domain.

Aspect 8: The method of aspect 7, further comprising: receiving, via the control signaling, an indication of the reporting prohibit timer, wherein initiating the reporting prohibit timer is based at least in part on receiving the control signaling.

Aspect 9: The method of any of aspects 7 through 8, further comprising: transmitting, within a fourth transmission occasion of the second subset of transmission occasions, a fourth L1 report comprising a fourth beam information report and an indication of the quantity of antenna ports supported by the UE, a second quantity of antenna ports supported by the UE, or both; and transmitting, via the fourth L1 report, an indication that the fourth L1 report includes antenna port information based at least in part on the fourth transmission occasion being positioned subsequent to the expiration of the reporting prohibit timer in the time domain.

Aspect 10: The method of any of aspects 1 through 9, further comprising: refraining from transmitting a third L1 report within a third transmission occasion of the second subset of transmission occasions.

Aspect 11: The method of any of aspects 1 through 10, further comprising: monitoring for feedback messages based at least in part on transmitting the second L1 report; and receiving a feedback message responsive to the second L1 report based at least in part on the monitoring.

Aspect 12: The method of any of aspects 1 through 11, further comprising: receiving a control message indicating an activation of the second subset of transmission occasions, wherein transmitting the second L1 report is based at least in part on the activation.

Aspect 13: The method of aspect 12, further comprising: receiving a second control message indicating a deactivation of the second subset of transmission occasions; and refraining from transmitting a third L1 report via the second subset of transmission occasions based at least in part on the deactivation.

Aspect 14: The method of any of aspects 12 through 13, wherein the control signaling comprises an RRC message, and the control message comprises a DCI message, a MAC-CE message, or both.

Aspect 15: The method of any of aspects 1 through 14, wherein receiving the control signaling comprises: receiving an RRC message indicating the first subset of transmission occasions; and receiving a DCI message scheduling the second L1 report within the first subset of transmission occasions.

Aspect 16: The method of any of aspects 1 through 15, further comprising: receiving a control message in response to the second L1 report, the control message comprising an acknowledgment of the second L1 report and indicating one or more updated TCI states associated with the second beam information report, the quantity of antenna ports, or both.

Aspect 17: The method of any of aspects 1 through 16, further comprising: receiving a control message in response to the second L1 report, the control message indicating a TCI codepoint associated with an acknowledgment of the second L1 report.

Aspect 18: The method of any of aspects 1 through 17, further comprising: receiving a feedback message in response to the second L1 report.

Aspect 19: The method of aspect 18, wherein the feedback message comprises a NACK message, the method further comprising: transmitting, in response to the NACK message and within a third transmission occasion of the second subset of transmission occasions, a third L1 report comprising the second beam information report and an indication of the quantity of antenna ports supported by the UE.

Aspect 20: The method of any of aspects 1 through 19, further comprising: receiving, via the control signaling, additional control signaling, or both, an indication of a set of resources associated with a plurality of reference signals; receiving the plurality of reference signals within the set of resources; and performing measurements on the plurality of reference signals, wherein the first beam information report, the second beam information report, or both, are based at least in part on the measurements.

Aspect 21: The method of any of aspects 1 through 20, further comprising: receiving, from a network entity and based at least in part on the second L1 report, a control message scheduling a communication between the UE and the network entity; and performing the communication with the network entity in accordance with the quantity of antenna ports supported by the UE.

Aspect 22: The method of any of aspects 1 through 21, wherein the second subset of transmission occasions are included within the first subset of transmission occasions.

Aspect 23: A method for wireless communication at a network entity, comprising: transmitting control signaling indicating a plurality of transmission occasions usable by a UE for transmitting L1 reports, the plurality of transmission occasions comprising a first subset of transmission occasions for transmitting beam information reports and a second subset of transmission occasions for transmitting beam information reports and corresponding antenna port information; receiving, within a first transmission occasion of the first subset of transmission occasions, a first L1 report comprising a first beam information report; and receiving, within a second transmission occasion of the second subset of transmission occasions, a second L1 report comprising a second beam information report and an indication of a quantity of antenna ports supported by the UE.

Aspect 24: The method of aspect 23, further comprising: transmitting, via the control signaling, an indication of a first periodicity associated with the first subset of transmission occasions and a second periodicity associated with the second subset of transmission occasions, wherein the first L1 report is received in accordance with the first periodicity, and wherein the second L1 report is received in accordance with the second periodicity.

Aspect 25: The method of aspect 24, wherein receiving the control signaling indicating the first and second periodicities comprises: transmitting an RRC message associated with a reporting configuration, the RRC message indicating a plurality of periodicities associated with the reporting configuration, wherein the plurality of periodicities comprise at least the first periodicity and the second periodicity.

Aspect 26: The method of any of aspects 24 through 25, wherein transmitting the control signaling indicating the first and second periodicities comprises: transmitting a first RRC message associated with a first reporting configuration, the first RRC message indicating the first periodicity associated with the first reporting configuration; and transmitting a second RRC message associated with a second reporting configuration, the second RRC message indicating the second periodicity associated with the second reporting configuration.

Aspect 27: The method of any of aspects 24 through 26, wherein the first periodicity is associated with a greater frequency as compared to the second periodicity.

Aspect 28: The method of any of aspects 23 through 27, further comprising: receiving, within a third transmission occasion of the second subset of transmission occasions, a third L1 report comprising a third beam information report; and receiving, via the third L1 report, an indication that the third L1 report does not include antenna port information.

Aspect 29: The method of aspect 28, further comprising: initiating a reporting prohibit timer based at least in part on receiving the second L1 report; and receiving the third L1 report without antenna port information based at least in part on the third transmission occasion being positioned prior to an expiration of the reporting prohibit timer in a time domain.

Aspect 30: The method of aspect 29, further comprising: transmitting, via the control signaling, an indication of the reporting prohibit timer, wherein initiating the reporting prohibit timer is based at least in part on transmitting the control signaling.

Aspect 31: The method of any of aspects 29 through 30, further comprising: receiving, within a fourth transmission occasion of the second subset of transmission occasions, a fourth L1 report comprising a fourth beam information report and an indication of the quantity of antenna ports supported by the UE, a second quantity of antenna ports supported by the UE, or both; and receiving, via the fourth L1 report, an indication that the fourth L1 report includes antenna port information based at least in part on the fourth transmission occasion being positioned subsequent to the expiration of the reporting prohibit timer in the time domain.

Aspect 32: The method of any of aspects 23 through 31, further comprising: transmitting a control message indicating an activation of the second subset of transmission occasions, wherein receiving the second L1 report is based at least in part on the activation.

Aspect 33: The method of aspect 32, wherein the control signaling comprises an RRC message, and the control message comprises a DCI message, a MAC-CE message, or both.

Aspect 34: The method of any of aspects 23 through 33, wherein receiving the control signaling comprises: transmitting an RRC message indicating the first subset of transmission occasions; and transmitting a DCI message scheduling the second L1 report within the first subset of transmission occasions.

Aspect 35: The method of any of aspects 23 through 34, further comprising: transmitting a control message in response to the second L1 report, the control message comprising an acknowledgment of the second L1 report and indicating one or more updated TCI states associated with the second beam information report, the quantity of antenna ports, or both.

Aspect 36: The method of any of aspects 23 through 35, further comprising: transmitting a control message in response to the second L1 report, the control message indicating a TCI codepoint associated with an acknowledgment of the second L1 report.

Aspect 37: The method of any of aspects 23 through 36, further comprising: transmitting a feedback message in response to the second L1 report.

Aspect 38: The method of aspect 37, wherein the feedback message comprises a NACK message, the method further comprising: receiving, in response to the NACK message and within a third transmission occasion of the second subset of transmission occasions, a third L1 report comprising the second beam information report and an indication of the quantity of antenna ports supported by the UE.

Aspect 39: The method of any of aspects 23 through 38, further comprising: transmitting, to the UE and based at least in part on the second L1 report, a control message scheduling a communication between the UE and the network entity; and performing the communication with the UE in accordance with the quantity of antenna ports supported by the UE.

Aspect 40: The method of any of aspects 23 through 39, wherein the second subset of transmission occasions are included within the first subset of transmission occasions.

Aspect 41: An apparatus for wireless communication at a UE, comprising a processor; memory coupled with the processor; and instructions stored in the memory and executable by the processor to cause the apparatus to perform a method of any of aspects 1 through 22.

Aspect 42: An apparatus for wireless communication at a UE, comprising at least one means for performing a method of any of aspects 1 through 22.

Aspect 43: A non-transitory computer-readable medium storing code for wireless communication at a UE, the code comprising instructions executable by a processor to perform a method of any of aspects 1 through 22.

Aspect 44: An apparatus for wireless communication at a network entity, comprising a processor; memory coupled with the processor; and instructions stored in the memory and executable by the processor to cause the apparatus to perform a method of any of aspects 23 through 40.

Aspect 45: An apparatus for wireless communication at a network entity, comprising at least one means for performing a method of any of aspects 23 through 40.

Aspect 46: A non-transitory computer-readable medium storing code for wireless communication at a network entity, the code comprising instructions executable by a processor to perform a method of any of aspects 23 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more memories; and
one or more processors coupled with the one or more memories, the one or more processors configured to:
receive control signaling indicating a plurality of transmission occasions usable by the UE for transmitting layer one reports, the plurality of transmission occasions comprising a first subset of transmission occasions associated with a first periodicity for transmitting beam information reports, and a second subset of transmission occasions associated with a second periodicity for transmitting beam information reports and corresponding antenna port information, the second periodicity different from the first periodicity;
transmit, within a first transmission occasion of the first subset of transmission occasions and in accordance with the first periodicity, a first layer one report comprising a first beam information report; and
transmit, within a second transmission occasion of the second subset of transmission occasions and in accordance with the second periodicity, a second layer one report comprising a second beam information report and an indication of a quantity of antenna ports supported by the UE.

2. The apparatus of claim 1, wherein the one or more processors are further configured to:
receive, via the control signaling, an indication of the first periodicity associated with the first subset of transmission occasions and the second periodicity associated with the second subset of transmission occasions, wherein the first layer one report is transmitted in accordance with the first periodicity, and wherein the second layer one report is transmitted in accordance with the second periodicity.

3. The apparatus of claim 2, wherein, to receive the control signaling indicating the first and second periodicities, the one or more processors are configured to:
receive a radio resource control message associated with a reporting configuration, the radio resource control message indicating a plurality of periodicities associated with the reporting configuration, wherein the plurality of periodicities comprise at least the first periodicity and the second periodicity.

4. The apparatus of claim 2, wherein, to receive the control signaling indicating the first and second periodicities, the one or more processors are configured to:
receive a first radio resource control message associated with a first reporting configuration, the first radio resource control message indicating the first periodicity associated with the first reporting configuration; and
receive a second radio resource control message associated with a second reporting configuration, the second radio resource control message indicating the second periodicity associated with the second reporting configuration.

5. The apparatus of claim 2, wherein the first periodicity is associated with a greater frequency as compared to the second periodicity.

6. The apparatus of claim 1, wherein the one or more processors are further configured to:
transmit, within a third transmission occasion of the second subset of transmission occasions, a third layer one report comprising a third beam information report; and
transmit, via the third layer one report, an indication that the third layer one report does not include antenna port information.

7. The apparatus of claim 6, wherein the one or more processors are further configured to:
initiate a reporting prohibit timer based at least in part on transmitting the second layer one report; and
transmit the third layer one report without antenna port information based at least in part on the third transmission occasion being positioned prior to an expiration of the reporting prohibit timer in a time domain.

8. The apparatus of claim 7, wherein the one or more processors are further configured to:
receive, via the control signaling, an indication of the reporting prohibit timer, wherein initiating the reporting prohibit timer is based at least in part on receiving the control signaling.

9. The apparatus of claim 7, wherein the one or more processors are further configured to:
transmit, within a fourth transmission occasion of the second subset of transmission occasions, a fourth layer one report comprising a fourth beam information report and an indication of the quantity of antenna ports supported by the UE, a second quantity of antenna ports supported by the UE, or both; and transmit, via the fourth layer one report, an indication that the fourth layer one report includes antenna port information based at least in part on the fourth transmission occasion being positioned subsequent to the expiration of the reporting prohibit timer in the time domain.

10. The apparatus of claim 1, wherein the one or more processors are further configured to:
refrain from transmitting a third layer one report within a third transmission occasion of the second subset of transmission occasions.

11. The apparatus of claim 1, wherein the one or more processors are further configured to:
monitor for feedback messages based at least in part on transmitting the second layer one report; and
receive a feedback message responsive to the second layer one report based at least in part on the monitoring.

12. The apparatus of claim 1, wherein the one or more processors are further configured to:
receive a control message indicating an activation of the second subset of transmission occasions, wherein transmitting the second layer one report is based at least in part on the activation.

13. The apparatus of claim 12, wherein the one or more processors are further configured to:
receive a second control message indicating a deactivation of the second subset of transmission occasions; and
refrain from transmitting a third layer one report via the second subset of transmission occasions based at least in part on the deactivation.

14. The apparatus of claim 12, wherein the control signaling comprises a radio resource control message, and wherein the control message comprises a downlink control information message, a medium access control-control element message, or both.

15. The apparatus of claim 1, wherein, to receive the control signaling, the one or more processors are configured to:
receive a radio resource control message indicating the first subset of transmission occasions; and
receive a downlink control information message scheduling the second layer one report within the first subset of transmission occasions.

16. The apparatus of claim 1, wherein the one or more processors are further configured to:
receive a control message in response to the second layer one report, the control message comprising an acknowledgement of the second layer one report and indicating one or more updated transmission configuration indicator states associated with the second beam information report, the quantity of antenna ports, or both.

17. The apparatus of claim 1, wherein the one or more processors are further configured to:
receive a control message in response to the second layer one report, the control message indicating a transmission configuration indicator codepoint associated with an acknowledgement of the second layer one report.

18. The apparatus of claim 1, wherein the one or more processors are further configured to:
receive a feedback message in response to the second layer one report.

19. The apparatus of claim 18, wherein the feedback message comprises a negative acknowledgement message, and wherein the one or more processors are further configured to:

transmit, in response to the negative acknowledgement message and within a third transmission occasion of the second subset of transmission occasions, a third layer one report comprising the second beam information report and an indication of the quantity of antenna ports supported by the UE.

20. The apparatus of claim 1, wherein the one or more processors are further configured to:
receive, via the control signaling, additional control signaling, or both, an indication of a set of resources associated with a plurality of reference signals;
receive the plurality of reference signals within the set of resources; and
perform measurements on the plurality of reference signals, wherein the first beam information report, the second beam information report, or both, are based at least in part on the measurements.

21. The apparatus of claim 1, wherein the one or more processors are further configured to:
receive, from a base station and based at least in part on the second layer one report, a control message scheduling a communication between the UE and the base station; and
perform the communication with the base station in accordance with the quantity of antenna ports supported by the UE.

22. The apparatus of claim 1, wherein the second subset of transmission occasions are included within the first subset of transmission occasions.

23. An apparatus for wireless communication at a network entity, comprising:
one or more memories; and
one or more processors coupled with the one or more memories, the one or more processors configured to:
transmit control signaling indicating a plurality of transmission occasions usable by a user equipment (UE) for transmitting layer one reports, the plurality of transmission occasions comprising a first subset of transmission occasions associated with a first periodicity for transmitting beam information reports, and a second subset of transmission occasions associated with a second periodicity for transmitting beam information reports and corresponding antenna port information, the second periodicity different from the first periodicity;
receive, within a first transmission occasion of the first subset of transmission occasions and in accordance with the first periodicity, a first layer one report comprising a first beam information report; and
receive, within a second transmission occasion of the second subset of transmission occasions and in accordance with the second periodicity, a second layer one report comprising a second beam information report and an indication of a quantity of antenna ports supported by the UE.

24. The apparatus of claim 23, wherein the one or more processors are further configured to:
transmit, via the control signaling, an indication of the first periodicity associated with the first subset of transmission occasions and the second periodicity associated with the second subset of transmission occasions, wherein the first layer one report is received in accordance with the first periodicity, and wherein the second layer one report is received in accordance with the second periodicity.

25. The apparatus of claim 24, wherein, to transmit the control signaling indicating the first and second periodicities, the one or more processors are configured to:
transmit a radio resource control message associated with a reporting configuration, the radio resource control message indicating a plurality of periodicities associated with the reporting configuration, wherein the plurality of periodicities comprise at least the first periodicity and the second periodicity.

26. The apparatus of claim 24, wherein, to transmit the control signaling indicating the first and second periodicities, the one or more processors are configured to:
transmit a first radio resource control message associated with a first reporting configuration, the first radio resource control message indicating the first periodicity associated with the first reporting configuration; and
transmit a second radio resource control message associated with a second reporting configuration, the second radio resource control message indicating the second periodicity associated with the second reporting configuration.

27. The apparatus of claim 24, wherein the first periodicity is associated with a greater frequency as compared to the second periodicity.

28. The apparatus of claim 23, wherein the one or more processors are further configured to:
receive, within a third transmission occasion of the second subset of transmission occasions, a third layer one report comprising a third beam information report; and
receive, via the third layer one report, an indication that the third layer one report does not include antenna port information.

29. A method for wireless communication at a user equipment (UE), comprising:
receiving control signaling indicating a plurality of transmission occasions usable by the UE for transmitting layer one reports, the plurality of transmission occasions comprising a first subset of transmission occasions associated with a first periodicity for transmitting beam information reports, and a second subset of transmission occasions associated with a second periodicity for transmitting beam information reports and corresponding antenna port information, the second periodicity different from the first periodicity;
transmitting, within a first transmission occasion of the first subset of transmission occasions and in accordance with the first periodicity, a first layer one report comprising a first beam information report; and
transmitting, within a second transmission occasion of the second subset of transmission occasions and in accordance with the second periodicity, a second layer one report comprising a second beam information report and an indication of a quantity of antenna ports supported by the UE.

30. A method for wireless communication at a base station, comprising:
transmitting control signaling indicating a plurality of transmission occasions usable by a user equipment (UE) for transmitting layer one reports, the plurality of transmission occasions comprising a first subset of transmission occasions associated with a first periodicity for transmitting beam information reports, and a second subset of transmission occasions associated with a second periodicity for transmitting beam information reports and corresponding antenna port information, the second periodicity different from the first periodicity;
receiving, within a first transmission occasion of the first subset of transmission occasions and in accordance with the first periodicity, a first layer one report comprising a first beam information report; and
receiving, within a second transmission occasion of the second subset of transmission occasions and in accordance with the second periodicity, a second layer one report comprising a second beam information report and an indication of a quantity of antenna ports supported by the UE.

* * * * *